United States Patent
Henneberger et al.

(10) Patent No.: US 9,830,244 B2
(45) Date of Patent: Nov. 28, 2017

(54) SAFETY SYSTEM WITH TEST SIGNAL PATH THROUGH BUS LINE AND TERMINATION ELEMENT

(71) Applicant: SICK AG, Waldkirch/Breisgau (DE)

(72) Inventors: Stephan Henneberger, Freiburg (DE); Frederik Behre, Rheinhausen (DE)

(73) Assignee: SICK AG, Waldkirch/Breisgau (DE)

( * ) Notice: Subject to any disclaimer, the term of this patent is extended or adjusted under 35 U.S.C. 154(b) by 924 days.

(21) Appl. No.: 14/044,020

(22) Filed: Oct. 2, 2013

(65) Prior Publication Data

US 2014/0101486 A1    Apr. 10, 2014

(30) Foreign Application Priority Data

Oct. 10, 2012   (EP) .................................... 12188009

(51) Int. Cl.
*G06F 11/34* (2006.01)
*G05B 9/02* (2006.01)
(Continued)

(52) U.S. Cl.
CPC ............ *G06F 11/3409* (2013.01); *G05B 9/02* (2013.01); *H04L 12/40176* (2013.01);
(Continued)

(58) Field of Classification Search
CPC ........... G06F 11/3409; H04L 12/40176; H04L 43/50; H04L 12/40195; H04L 12/437; G05B 9/02
See application file for complete search history.

(56) References Cited

U.S. PATENT DOCUMENTS 4,630,233 A    12/1986  Weppler
5,487,448 A *   1/1996  Schollkopf ........... B66B 5/0006
                                              187/247
(Continued)

FOREIGN PATENT DOCUMENTS

DE    102004020997 A1   11/2005
DE    102008032823 A1    1/2010
(Continued)

OTHER PUBLICATIONS

'SAFEbus', Hoyme et al., Proceedings Digital Avionics Systems Conference, IEEE, 1992.*
(Continued)

*Primary Examiner* — Mohammad Ali
*Assistant Examiner* — Bernard G Lindsay
(74) *Attorney, Agent, or Firm* — Nath, Goldberg & Meyer; Jerald L. Meyer

(57) ABSTRACT

Multiple safety related participants are arranged along a bus line in such a way that both a forward test signal path and a return test signal path run through the same safety related participants and the safety related participants are adapted in such a way that the occurrence of a non-secure state of their protective device brings about an interruption of the test signal path. A termination element connects the forward test signal path to the return test signal path. The safety unit is configured to transmit an output signal at its output and the termination element is configured to receive the output signal from the forward test signal path and to output a test signal to the return test signal path. The test signal is changed with respect to the received output signal in dependence on the received output signal.

12 Claims, 11 Drawing Sheets

Figure 1:
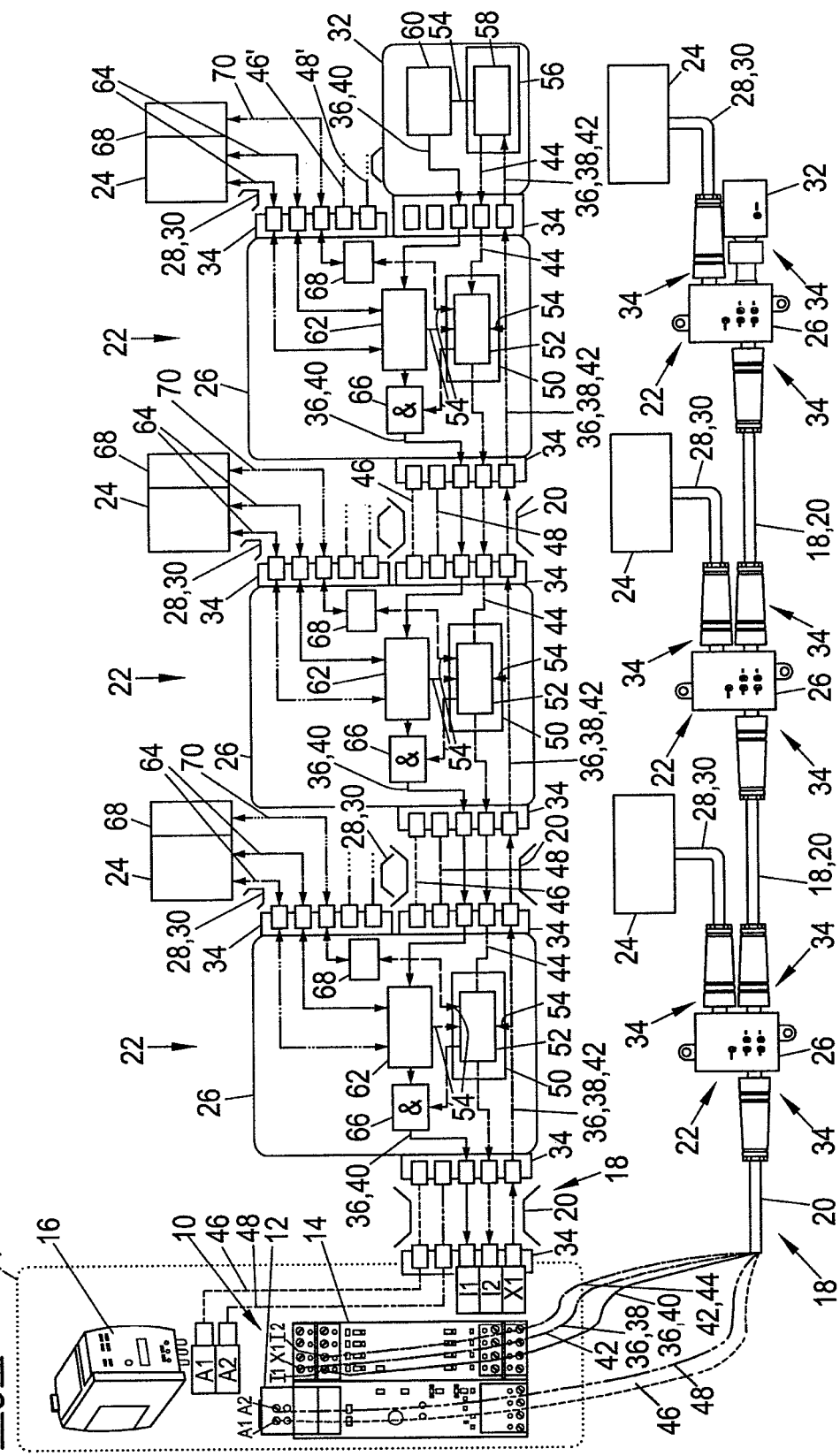

(51) Int. Cl.
*H04L 12/437* (2006.01)
*H04L 12/40* (2006.01)
*H04L 12/26* (2006.01)

(52) U.S. Cl.
CPC ...... *H04L 12/40195* (2013.01); *H04L 12/437* (2013.01); *H04L 43/50* (2013.01)

(56) References Cited

U.S. PATENT DOCUMENTS

| | | |
|---|---|---|
| 6,832,343 B2 | 12/2004 | Rupp et al. |
| 7,411,319 B2 | 8/2008 | Suhara et al. |
| 8,522,204 B2 | 8/2013 | Moosmann et al. |
| 8,560,094 B2 | 10/2013 | Ehrhart et al. |
| 8,595,827 B2 | 11/2013 | Zondler et al. |
| 2002/0093951 A1 | 7/2002 | Rupp et al. |
| 2006/0244619 A1 | 11/2006 | Nickels |
| 2009/0024230 A1 | 1/2009 | Hioka et al. |
| 2009/0112336 A1* | 4/2009 | Duffy ................. G06F 1/12 700/79 |
| 2009/0222107 A1* | 9/2009 | Moddemann ..... H04L 12/40169 700/21 |
| 2009/0231123 A1* | 9/2009 | Rowell ................. B61B 12/06 340/532 |
| 2009/0265571 A1 | 10/2009 | Furukawa et al. |
| 2011/0098829 A1* | 4/2011 | Weddingfeld ....... G05B 19/052 700/2 |
| 2011/0112700 A1 | 5/2011 | Tajima |
| 2011/0301720 A1 | 12/2011 | Ehrhart et al. |
| 2012/0005748 A1 | 1/2012 | Zondler et al. |

FOREIGN PATENT DOCUMENTS

| | | |
|---|---|---|
| DE | 102010025675 B3 | 11/2011 |
| DE | 102011079688 A1 | 4/2012 |
| DE | 202010016148 U1 | 4/2012 |
| DE | 102011016137 A1 | 10/2012 |
| EP | 1363306 A2 | 11/2003 |
| EP | 1393280 A1 | 3/2004 |
| EP | 1699203 A1 | 9/2006 |
| EP | 2051422 A1 | 4/2009 |
| EP | 2101237 A2 | 9/2009 |
| EP | 2209262 A1 | 7/2010 |
| EP | 2362408 A1 | 8/2011 |

OTHER PUBLICATIONS

"Planning and Installation Manual," ODVA Cable System, 2002-2003, pp. 1-98, ODVA.

European Search Report for Application No. 12188009.0, dated Mar. 14, 2013, attached with English Translation, seven (7) pages.

* cited by examiner

SAFETY SYSTEM WITH TEST SIGNAL PATH THROUGH BUS LINE AND TERMINATION ELEMENT

The present invention relates to a safety system which can, for example, be used for recognizing a hazardous situation at a safety critical plant or machine and for carrying out a safety related cutoff in a hazardous situation.

Safety systems of the mentioned kind typically comprise a safety unit, e.g. configured as a safety control, having an output and having a safety input and having at least one safety related participant formed by a protective device. In this connection a test signal line and/or a bus line connected to the output and to the safety input together with the safety related participant form a test signal path for transmitting a dynamic test signal generated by the safety control, wherein the safety related participant is configured, to bring about an interruption of the test signal path on the presence of, or respectively the occurrence of, a non-secure state. If the expected test signal fails to appear at the safety input of the safety control due to an interruption of the test signal path, then the safety control can initiate a safety measure and can, for example, interrupt the current supply to a safety critical plant and thereby to switch this off, whereby the safety system fulfills its safety function.

A safety system can also comprise a plurality of protective devices connected to the safety control which can e.g. be arranged locally distributed, wherein a non-secure state of an arbitrary protective device can respectively lead to an interruption of the test signal path and to the safety function becoming active, this means e.g. to the cutoff of the plant by means of the safety control.

The reaction to a non-secure state of a protective device, e.g. in the form of a safety related cutoff, represents the actual intended safety function which has to be reliably ensured for the error-free operation of the safety system. Apart from this, errors in the safety system can arise such as e.g. performance errors or cable errors such as interruptions, cross-circuits and short circuits of line conductors or similar errors. Such that the safety system satisfies a high safety level e.g. in accordance with the norms IEC 61508 or EN ISO 13489-1 it must be ensured that such a case of error is recognized or respectively at least does not lead to a loss of the safety function of the safety system. Rather more a safety related cutoff of the plant should preferably also occur reliably in such a case of error.

Safety systems having a ring-shaped bus line are known, wherein a plurality of safety related participants and/or protective devices are connected to the ring-shaped bus line arranged in a ring-shaped topology and are connected in series via the bus line and are thereby cascaded. The ring-shaped bus line and the protective devices in this respect form a test signal path having a forward path and a return path arranged in separate bus line sections. The test signals subsequently run through all protective devices of the cascade, with these respectively being adapted for the interruption of the test signal path on the occurrence of a non-secure state in such a way that the test signal is only then fed back to the safety control in the expected form for an error-free function of the safety system when all protective devices are present in their secure state. The test signal received at the input of the safety control thus makes available a summed information which states whether all protective devices are present in their secure state or not. Through the separate line routing of the forward path and the return path of the test signal path ensured by the ring topology it is avoided that a protective device is bridged by a cross circuit between the forward path and the return path of the test signal path in such a way that a bridging of the respective protective device and the thereby a brought about loss of the safety function is avoided.

EP 1 393 280 A1 discloses a safety system having a safety unit and having a plurality of safety related participants which are connected to a bus line connected to the safety unit in a ring topology as previously described and with the bus line forming a ring-shaped test signal path. In accordance with an embodiment a plurality of protective devices are connected to a connector box in a star-shaped manner by means of which connector box the protective devices are connected to the bus line. The safety unit transmits a sequence of pulses as a test signal via the bus line, wherein the test signal is phase-inverted and delayed in time in each protective device. The safety control controls the facts that the sequence of pulses included in the received test signal has the expected phase position and an expected time delay. Through the checking of the phase position it is ensured that a bridging of protective devices e.g. by means of a short-circuit in the test signal path leads to the triggering of the safety related cutoff through the safety system.

From the DE 10 2010 025 675 B3 a safety system is known which has a safety unit and a plurality of protective devices which are respectively connected to the safety unit via two-wired lines and which are switched in parallel to one another, wherein a substantially constant voltage is respectively present between the two conductors of a two-wired line and the protective devices are respectively configured to generate a defined pulse signal at the two-wired lines in dependence on their switching state. For generating a pulse of the pulse signal the protective devices respectively bring about a voltage drop between the two conductors of the two-wired line, for example, by closing a short-circuit switch.

On use of a plurality of protective devices which are arranged distributed along a plant with a larger linear extent, the realization of a safety system with a desired high safety level in accordance with the state of the art is very demanding in effort and cost. In particular, the connection and cabling of the participants for the manufacture of the safety system is associated with a considerable demand in materials and time. Moreover, it is not possible to transmit data between a safety control and the protective devices in addition to the safety information transmitted at the test signal path without considerable further demands in effort and cost being necessitated.

It is the object of the invention to provide a safety system having a plurality of protective devices which can be made available with lesser demands in time and cost and, in particular requires a lesser demand in cabling and which simultaneously ensures a high safety level. Moreover, the safety system should make available a data transmission between the safety control and the safety related participants for a less complex system and a lesser demand of implementation.

To satisfy this object a safety system having the features of claim 1 is provided.

The safety system in accordance with the invention comprises:
  a safety unit having an output and having a safety input;
  a bus line which is connected to the output and to the safety input of the safety unit; and
  a plurality of safety related participants connected to the bus line which respectively comprise a protective device.

The bus line and the safety related participants connected to the bus line form a test signal path having a forward path connected to the output of the safety unit and a return path connected to the safety input of the safety unit. At least some of the safety related participants and preferably all of the safety related participants of the system are arranged along the bus line in a line in such a way that both the forward path and the return path of the test signal path run through the same safety related participants and are adapted in such a way that the occurrence of a non-secure state of the associated protective device brings about an interruption of the test signal path. The safety system further comprises a termination element connecting the forward path and the return path of the test signal path, said termination element preferably being connected at the end of the line;

wherein the safety unit is configured to transmit an output signal at the output connected to the forward path, and wherein the termination element is configured to receive the output signal from the forward path and to output a test signal to the return path of the test signal path in dependence on the output signal received from the forward path, said test signal being changed with respect to the received output signal.

An expectation is preferably stored with respect to the test signal received at the safety input in the safety unit and the safety unit, which is preferably configured as a safety control, is adapted to check whether the actually received test signal corresponds to this expectation and otherwise to carry out and/or to initiate, in particular a safety related measure, such as e.g. a safety related cutoff. For example, the expectation can comprise the fact that a maximum allowable deviation in time or delay between the point in time at which a test gap of the test signal entering the safety unit is expected and the actual presence of a test gap in the incoming test signal is not exceeded and/or in that the duration of a test gap of the incoming signal corresponds to a test gap duration. Thus, for example, a constant presence of a low signal level ("Low") at the safety unit, e.g. due to an interruption of a protective device, leads to a response of the safety function and preferably to a triggering of the safety related cutoff just like an absence of an expected test gap due to a so-called "stuck-at-high"-error, this means to a constantly present high signal level ("High").

The safety system in accordance with the invention comprises a bus line at which a plurality of safety related participants are connected which form a test signal path together with the bus line and which are configured to interrupt the test signal path on the presence of a non-secure state of their protective device.

A protective device can, for example, be a secure protective device which is configured to take on a secure state or a non-secure state in dependence on an outer influence relevant for the safety, e.g. of a person. For example, it can be an emergency cutoff switch which comprises one or more e.g. mechanical switching contacts which are closed in the secure state of the emergency cutoff switch, this means in the non-actuated state, and which are open in the non-secure state of the emergency cutoff switch, this means the actuated state of the emergency cutoff switch. A further example is a guard control apparatus of a safety door which has one or more in particular magnetically controlled switching contacts which are closed in the secure position of the door, this means closed position of the door and which are opened in the non-secure position of the door, this means the open position of the door.

The safety related participants are switched to a one channel tested cascade via the bus line in such a way that a non-secure state at an arbitrary safety related participant switched electrically in series via the bus line leads to the absence of test signal corresponding to an expectation at the safety input of the safety unit and preferably to the triggering of a safety measure. The test signal received at the safety input in this way represents a safety information and/or a summed information in such a way that a test signal corresponding to the expectation then only arrives at the safety input when all protective devices are present in a secure state and the test signal path is not interrupted.

Some and preferably all of the safety related participants of the system are arranged along the bus line in a line in such a way that both the forward path and also the return path of the test signal path run through the same safety related participants. Thereby, a safety system having a line topology is realized in which the sections of both the forward path and also of the return path of the test signal path, can be arranged e.g. as separate conductors in a common bus cable of the bus line between two safety related participants and can be connected to the respective safety related participant via a common plug element. In comparison to a ring topology having a return line of the test signal path guided separate from the forward line the demand required thereby for the cabling is considerably reduced.

The line formed by the safety related participants is terminated by a termination element preferably arranged at the end of the line, said termination element being configured to receive an output signal transmitted from the safety unit via the forward path and to transmit a dynamic test signal to the return path of the signal path in dependence on the output signal received from the forward path, said test signal being changed with respect to the received output signal. A bridging of the termination element, in particular by means of a cross-circuit present in the bus line between the forward path and the return path of the test signal path thus reliably leads to the fact that no test signal corresponding to the expectation is received, since the change of the output signal carried out by the termination element is interrupted and/or bridged for an error-free function.

The safety unit and its expectation can be correspondingly configured in such a way that a signal changed with respect to the transmitted output signal is expected and/or such that the expectation posed on the received test signal presupposes that a signal change and/or a signal conversion has been carried out by the termination element. In this way it is achieved that the expectation is reliably violated through the test signal arriving at the safety input when, for an otherwise error-free function of the safety system, a cross-circuit is present between the forward path and the return path of the test signal path through which cross-circuit the termination element is bridged. This in particular means that the output signal transmitted from the safety unit and/or received by the termination element in an error free operation does not satisfy the expectation of the safety unit on the returned test signal. The safety unit then only reliably obtains the expected test signal when both the forward path and the return path are not interrupted or cross-circuited and when also no other form of line errors are present in the safety system. For example, the signal change and/or signal conversion carried out by the termination element can take place once in the safety system, this means that the safety related participants are not adapted to carry out a corresponding signal change and/or signal conversion of the signal transmitted via the test signal path.

Since the termination element connects the forward path and the return path of the test signal path and is preferably arranged at the end of the line, a bridging brought about by a previously described cross-circuit at an arbitrary position of the bus line also leads to a bridging of the termination element and thus to the previously described violation of the expectation in such a way that it is not possible that a protective device and its protective functions are bridged due to a line error without this error being recognized and a safety measure being initiated. In this manner a high safety level is achieved for the in this connection allowable routing of the forward path and the return path of the test signal path in a common cable, despite the line topology and the inherent possibility of a cross-circuit between these paths.

Advantageous embodiments of the invention are described in the subordinate claims, the description and the Figures.

The safety unit can in principal comprise a safety component, such as, e.g. a safety relay, a safety sensor, a safety actor or a similar safety component which has an output and a safety input for an output signal and/or a test signal.

Preferably the safety unit is formed by a safety control which is preferably adapted to carry out a safety measure on the absence of the expected test signal and to actively control, in particular a monitored plant or an installation connected thereto in order to transfer the plant into a secure state. For example, the safety control can bring about an interruption of the current supply to the plant, in particular by controlling a relay arranged in a current supply line. The safety control can comprise a digital logic unit which can comprise one or more microprocessors and which preferably controls the transmission of the output signal and/or the evaluation of the incoming test signal.

When in the following the advantageous embodiments of the invention are explained with reference to a safety control these explanations are to be generally related to the application of the invention to a safety unit, with the realization of the invention being illustrated by means of a preferred embodiment of a safety control.

Preferably, the termination element is adapted to output a test signal corresponding to the expectation of the safety control only for an orderly receipt of the output signal transmitted by the safety control. The termination element is preferably configured to output a test signal synchronized to the dynamically output signal transmitted by the safety control. In accordance with an embodiment, the output signal transmitted by the safety control has synchronization features which preferably recur periodically and spaced apart from one another with respect to time. A synchronization feature can, for example, include an increasing and/or a decreasing flank of the output signal and can preferably be formed by a test gap having a specific length, this means a low signal level present for a certain period of time or by a test gap having a certain length followed by a high signal level present for a certain period of time. In order to synchronize the output test signal with the received output signal, the termination element preferably detects and identifies the synchronization features and synchronizes the output test signal with the presence of the synchronization features in the received output signal in such a way that the test signal and/or the expected features of the test signal, such as e.g. test gaps of the test signals are at least substantially synchronous with the output signal. In this connection, the point in time of transmission of the test feature by the termination element preferably at least substantially coincides with the point in time of the transmission of the synchronization features in the signal output by the safety control. The termination element can have its own time base independent from the time base of the received output signal for this purpose, for example, a clock generator of a microprocessor used for the generation of the test signal and can monitor the presence of synchronization features in the received output signal and can synchronize the time base with the presence of the synchronization features.

The expectation of the safety control, this means the criteria on which the test signals received at the safety input of the safety control are checked in order to determine whether a non-secure state of a protective device or a different case of error is present, preferably comprises the synchronicity of the received test signal to the transmitted output signal, at least in the framework of a predefined timely tolerance window. Through such a synchronicity criteria it is ensured that a non-secure state of a protective device or another case of error is recognized particularly reliably and e.g. leads to a safety related cutoff and a non-desired presence of a signal randomly corresponding to the expectation at the safety input is reliably excluded in a non-secure state of a protective device or in an error state of the safety system.

The test signal output by the termination element can in principle be different from the output signal of the safety control received at the termination element in an arbitrary manner, insofar as the expectation of the safety control is reliably violated in the case of a non-secure state of a protective device and in a case of error, such as, in particular a cross-circuit of the forward and the return path of the test signal path bridging the termination element. In a particularly simple case the termination element can transmit a signal to the return path delayed in time with respect to the signal received from the forward path, with the expectation of the safety control then being able to be matched in such a way that its expectation presupposes the delay. The test signal can also be different from the output signal with respect to its signal shape and can, for example, have one or more test features, in particular periodically recurring test features, which can be different from the synchronization features of the output signal and/or can be different from the output signal due to a lack of data features present in the output signal as will be described in the following. Preferably, the termination element is adapted to actively generate the test signal, wherein active components and components having an own signal dynamics, such as, for example a microprocessor and/or an own time base of the termination element can be used. Preferably, the termination element is further adapted to actively transmit the test signal to the return path, this means to transmit the test signal in a signal driving manner.

In accordance with a further advantageous embodiment, the safety system is adapted to transmit data between the safety control and the safety related participants and/or the termination element in addition to the safety information transmitted via the test signal path. In this connection the safety control can be configured to transmit data to the safety related participants and/or to the termination element and/or the safety related participants and/or the termination element can be configured to transmit data to the safety control.

The data sent from the safety related participants to the safety control preferably comprises diagnostic information and/or status information which is generated by the safety related participants and/or their protective devices. The diagnostic information and/or status information can, for example, comprise a piece of information delivered by a standard output of a protective device, such as, e.g. a "weak" signal provided by a standard output of a protective device configured as a laser scanner which signal states whether a contamination of the front disk of the laser scanner is present.

The information can also indicate the safety relevant switching state of the respective protective device which state is simultaneously decisive for the interruption of the test signal path, this means the information on whether the safety related participant is present in the secure or non-secure state. Erroneous data can also include e.g. a piece of information on an error of function of the safety related participant determined by the safety related participant or on the function of a different component in the safety system. This additional information enables the safety control to determine which protective device possibly caused a safety related cutoff and/or whether a safety related cutoff was triggered due to a non-secure state of a protective device or due to an error in the safety system.

The data transmitted from the safety control to the safety related participants can comprise control data for the control of functions of the safety related participants, such as e.g. the activation or deactivation of a locking function of a safety related participant equipped with a locking function for a safety door.

For carrying out the above-described data communication the safety system can preferably comprise a data path used together by the safety related participants and the termination element, wherein the safety related participants and possibly the termination element are preferably connected in a series one after the other for the reception and/or transmission of data to and from the data path and are connected to this. Through the use of a common data path the required cabling demand and the number of inputs and outputs used at the safety control can be significantly reduced, since no parallel cabling of the individual safety related participants to the safety control or a further logic control is required.

The data path can have a data forward path connected to an output of the safety control for the transmission of data generated and output by the safety control and/or have a data return path connected to an input of the safety control for the transmission of data generated by the safety related participants and/or the termination element to the safety control. The data forward path and the data return path preferably form a closed ring-shaped data path connected to an output and an input of the safety control. In this connection both the data forward path and the data return path run through the same safety related participants of the safety system in such a way that the safety related participants form a line topology also with respect to the ring-shaped data path, with the termination element preferably being arranged at the end of the line.

The data forward path can be formed by the forward path of the test signal path and can be identical to this, wherein the output signal transmitted from the safety control to the forward path of the test signal path preferably comprises the output data of the safety control transmitted to the safety related participants. In this way a separate data forward path can be omitted. For this design the previously described change of the test signal transmitted by the termination element and changed with respect to the received output signal of the safety control can comprise the fact or be composed such that the output signal comprises data features representing the transmitted data which are not included in the test signal. In principle it is, however, also possible to provide a data forward path which is separate from the forward path of the test signal path. The data return path is preferably formed as a separate signal path.

Preferably, a serial digital communication takes place at the data path, this means that the individual data features which respectively represent e.g. a data bit, can be consecutively transmitted in time windows separate from one another and following one another in time. The bit duration, this means the duration of a data feature representing a bit can e.g. amount to between 1 and 10 ms, in particular to approximately 4 ms. The data features each differ preferably unambiguously from the synchronization features of the output signal of the safety control serving as the synchronization with the test signal. The data signal transmitted on the data path can e.g. be configured as a binary direct current or preferably as a direct voltage signal, with the value of the voltage of the binary direct voltage signal being able to change e.g. between a low value and/or a low level "Low" of e.g. 0 Volt or ground potential and a high value and/or level "High" of e.g. 24 Volts.

Preferably, the safety system is adapted to carry out a bus communication at the data path, in particular a bus communication in accordance with the master-slave-principle at which the safety control, the safety related participants and/or the termination element preferably participate as bus participants and/or "participants", wherein the safety control preferably forms the bus master and is adapted to control the communication at the data path and/or to generate a signal by means of which the communication is synchronized.

Preferably a sequential communication and a sequential data flow, in particular in accordance with a kind of daisy-chain-communication or a message chain takes place between the communication participants connected to one another in a series via the data path, in this connection the participants are preferably respectively adapted to receive a data signal and/or a signal including data at an input of an upstream participant in the series to read out the received data and possibly further process this and, preferably at the same time, to generate a data signal preferably changed with respect to the incoming data signal and to provide it at an output differing from the input for a next participant and to transmit this data signal to the next participant. In this connection each participant is preferably connected to precisely one upstream participant and to one downstream participant in a manner capable of communication in this way. For this purpose, a participant preferably comprises a transmission and a reception circuit which can, for example, comprise a microprocessor. The data transmission can take place starting from the safety control in the previously described sequential manner via the remaining communication participants in a ring-shaped manner back to the safety control in such a way that the ring communication and/or a ring bus communication is realized.

Preferably, the data included in the data signals transmitted by the safety related participants and possibly by the termination element is at least partly identical to the data contained in the respective incoming data signal, this means that the identical data of the series are passed from one participant to the next. In this manner, data e.g. generated and transmitted by the safety control and determined for an arbitrary participant in the chain can be forwarded and transmitted starting from the safety control via the respective participants arranged in the chain of safety related participants up to the desired participant.

The data included in the output data signal of a participant which stem from the incoming data signal of the participant are preferably delayed in time with respect to the incoming data in the output data signal and are preferably shifted in time by a fixed duration, such as e.g. a bit duration or a duration corresponding to a predetermined number of bits. A participant can comprise a data buffer or a data store for the intermediate storage of the data to be forwarded. A timely coordinated and in particular synchronous communication of all participants can be ensured on the data path through such a delay, independent of the time requirement which a participant requires for the signal generation, data processing etc. carried out by the participant.

In a similar manner data generated by a safety related participant or the termination element can be forwarded and transmitted to the safety control by the participants to the respectively following participants in the chain. Preferably, the output data signal of a respective participant has data generated by the respective participant which is initially transmitted to the next participant in the chain and thereby finally to the safety control in the previously described manner via the data path.

In the framework of the invention it is preferred that the forward path of the test signal path is looped through the safety related participants up to the termination element in such a way that the output signal, possibly including data from the safety control, arrives substantially unchanged at the termination element. The previously described transmission activity and/or reception activity of the safety related participants consequently preferably takes place at the data return part of the safety system.

A respective unambiguous bus address is preferably associated with the safety related participants and possibly the termination element. Preferably, the time windows can be identified with reference to the bus address during which time windows the data and/or bits are included in the incoming data signal of the respective participant which are addressed for the respective participant and which should be received by this and which should, for example, be used for the control of the processes in the participants, e.g. for the control of a function, such as, for example, a locking function of the protective device of the safety related participant. Likewise, time windows can be identified in the output data signal of the respective participant by means of the addresses in which time windows the participants can introduce the output data generated by it and can transmit the output data, in particular output data determined for the safety control, for example, diagnostic information and/or status information generated by the safety related participant, such as e.g. a "weak" piece of information of a protective device formed as a laser scanner, into the output data signal. The participants are adapted to identify the corresponding time windows with reference to their address in order to identify the data addressed to them in the incoming signal and/or in order to send data generated by them and to be sent to the safety control, such as diagnostic information and/or status information, in the corresponding time windows.

In order to enable a correct and corresponding timely determination of the respective time window through the participants, the participants synchronize one another preferably to one another, for example, by synchronization with the data signal transmitted at the data path and/or with synchronization features contained therein. In this connection, the participants possibly also consider an additional time delay with reference to their address which time delay is brought about by a previously described time delay of the data in the output data signal of a participant with respect to the corresponding data in the incoming data signal of the same participant. Preferably, the participants are incrementally addressed in correspondence with their sequence in the data flow direction in such a way that each participant can determine the number of the preceding participants in the data path and thereby the expected accumulated delay of the data in the incoming data signals with reference to its address.

In accordance with an advantageous embodiment a participant reads the data of the incoming data signal addressed to it and outputs at least a part of the remaining received data via its output data signal, however, does not output the data addressed to the respective participant and read out by it. The time window thereby "becoming free" in the output signal can be used for the transmission of the output data generated by that participant. Thereby, an ideal utilization of the data transmission capacity of the data path is achieved.

As previously described, the participants synchronize the data communication preferably with respect to one another in order to ensure a synchronized data communication and a synchronous transmission of the data traffic. Preferably, this synchronization takes place on the basis of a signal transmitted by the safety control. The synchronization can take place, for example, on the basis of synchronization features included in the output signal of the safety control which synchronization features are also used for the synchronized output of the test signal through the termination element. The output data signals generated by the safety related participants and/or the termination element as a participant of the communication as previously described can respectively include synchronization features which are synchronized with the synchronization features of the incoming data signal of the respective participant and are preferably transmitted substantially simultaneously with these. These synchronization features can be used by the respective downstream participant for synchronization. The safety related participants can also use the output signal of the safety control transmitted on the data forward path for the synchronization and synchronize their data communication with the therein included synchronization features, when, as previously described, not only the data return path, but also the data forward path preferably formed by the forward path of the test signal path runs through the safety related participants.

Preferably, the data signals are assembled from consecutive data boxes or data frames which are respectively composed of a plurality of time windows following one another. The previously described synchronization features can in this respect be used in order to mark the start of a respective data frame, this means that the synchronization features can serve as frame signals. In this connection, an increasing or decreasing signal flank included in the synchronization features can preferably be used as a starting mark of the data frame. Each participant of the data communication is then unambiguously associated with time windows within a data frame within which time windows data for the respective participant can be sent and/or data generated by the participant can be output. The frame duration is preferably identical to the cyclic time of the test signal and can amount to e.g. less than 100 ms and preferably to approximately 40 ms.

The safety system can be adapted to automatically determine the addresses of the participants at the communication in a teaching and/or configuration phase of the safety system and to communicate these to the participants. In this connection, an address signal is transmitted via the data path from the safety control which consecutively passes through the termination element and the participants along the chain, wherein each safety related participant respectively takes on an address corresponding to the received address signal and stores and transmits an address signal corresponding to the next higher address to the next safety related participant up until the sequence has been run through and the safety related participant and the termination element have been addressed in correspondence with their sequence in the chain.

Preferably, the safety system is adapted in such a way that the data transmission takes place in accordance with a predetermined protocol which includes e.g. the transmission of predetermined data or messages which are e.g. transmitted from the termination element and/or the safety related participants to the safety control. The protocol is selected in such a way that a data signal corresponding to the protocol only arrives at the safety control for an intact data path, this means on the absence of line errors, such as cross-circuits, short-circuits or interruptions of the data path. Furthermore, the protocol is preferably configured in such a way that the transmitted data signals are unambiguously differentiated from the test signal of the termination element. The safety control verifies the received data signals and checks the integrity of the received data and/or data frames for transmission errors and plausibility errors. A safety related cutoff can be carried out when the received signal does not correspond to the protocol and/or a continuous invalid communication is determined. The expected error detection time of the safety system can be reduced by this additional check of the data protocol.

In accordance with a preferred embodiment the safety control comprises a safety module and a connection module connected to the safety module. In this connection, the bus line, the safety related participant and the termination element can be connected to the safety module via the connection module. The safety module and the connection module are prefer-ably designed as two devices independent from one another and in particular each equipped with an own housing which are connected to one an-other via one or more connections accessible from the outside. The safety module can also comprise a plurality of modules respectively equipped with an own housing which together form the safety module, for example a main module and one or more input/output modules. The modularity of the safety control enables the realization of the safety system in accordance with the invention with the herein described advantages on use of known safety modules, in that the connection module connected to the safety module provides the additional functions required for this purpose.

While the connection module and the safety module which is possibly composed of a main module and one or more input/output modules are thus a part of the safety control, the interconnection modules described in the following at a different position are each a part of a respective safety related participant.

The safety module can, in a manner known per se, comprise at least one output for the transmission of an outgoing dynamic test signal and at least one safety input for the reception of an incoming dynamic test signal. The safety module can be configured to determine when the test signal received at the safety input does not correspond to the expectation and in particular to carry out a safety related cutoff, wherein an incoming test signal is expected by the safety module, for example, substantially unchanged with respect to its output test signal.

The connection module is preferably configured to generate the dynamic output signal of the safety control in dependence on the test signal transmitted at a first output of the safety module and to transmit this to the forward path of the test signal path. The connection module generates the output signal in dependence on the output test signal of the safety module preferably in such a manner that the output signal is synchronous with this test signal and e.g. includes synchronization features which are synchronous with the test signal transmitted by the safety module and, in particular to synchronization features periodically arising therein, such as, e.g. test gaps.

The connection module preferably receives the test signal transmitted via the return path of the test signal path and evaluates this in order to determine whether the system is operating error-free and whether the safety related participants are present in their secure state. This evaluation can take place in addition to a subsequently described safety check carried out by the safety module.

The safety module can have a first safety input associated with the first output of the safety module and can be configured to check whether the test signal received at the first safety input corresponds to an expectation, wherein, in particular a signal unchanged with respect to a test signal transmitted at the first output can be expected. In this connection the system is adapted in such a way that a test signal is received at the first safety input of the safety module precisely then when a test signal corresponding to the expectation is received, when the system functions in an orderly manner and the safety related participants are respectively present in their secure state. For this purpose, the test signal transmitted via the return path of the test signal path can be conveyed to the first safety input of the safety module and indeed preferably via the connection module. The connection module can pass on the test signal to the safety module unchanged or carry out a change of the test signal, in particular to transmit a test signal corresponding to the expectation of the safety module during a normal mode of operation.

In accordance with an embodiment the safety module comprises a second output and a second a safety input associated with the second output. The safety module can be adapted to transmit a test signal at the second output and to check whether a signal received at the second safety input corresponds to an expectation, wherein, in particular a signal unchanged with respect to the test signal transmitted at the second output can be expected. The second output and the second safety input are preferably connected to the connection module. In this respect the connection module is adapted to forward the test signal transmitted by the second output unchanged to the second safety input, when the connection module determines that the system is working error-free and that the safety related participants are present in their secure state during the previously described check by means of the connection module. Otherwise, the forwarding is prevented by the connection module. The connection module can cause the response of a safety related function of the safety related module in this way, such as e.g. a safety related cutoff.

The connection module can additionally realize a data communication with the safety related participants and/or the termination element as previously described with respect to the safety control and e.g. transmit data to the participants of the communication in the described manner and/or receive data from these, preferably by generation of an output signal transmitted via the forward path of the test signal path, said output signal including data and/or data features. In this connection the connection module preferably forms the bus master of a bus communication carried out on the data path.

In accordance with an advantageous embodiment the connection module is connected to a logic control module, such as, for example, a memory programmable control and is configured to send data received from the safety related participants to the logic control module and/or to receive data generated by the logic control module and to send this data to the safety related participants and/or the termination element via the data path. The previously described possibility of receiving diagnostic information and/or status information from the safety related participants and/or the termination element or to transmit data to the safety related participants and/or to the termination element is thereby achieved even then when the safety module is not adapted for carrying out the corresponding functions. Such a logic control module is, however, not necessarily required.

The connection module can also comprise a visual display at which relevant information can be indicated to a user which can e.g. depend thereon whether the system functions error-free and/or thereon whether the safety related participants are present in their secure state and/or on the data transmitted via the data path.

The connection module is preferably adapted to configure the termination element in such a way that the termination element generates a test signal during the error-free and orderly operation of the safety system and to transmit this to the return path of the test signal path which signal corresponds to the test signal expected by the safety module. For this purpose, the connection module can transmit corresponding configuration information to the termination element. The termination element can in principle, however, be supplied and configured with the corresponding information also during a configuration phase from a different source, for example a configuration computer. The information can, for example, comprise the cycling time of the test signal, such as e.g. the duration of a period of a periodically recurring test gap of the expected test signal.

The safety related participants in accordance with the invention respectively comprise at least one secure protective device which is configured to take on a secure state or a non-secure state in dependence on an outer influence relevant for the safety of e.g. a person. The safety related participants are adapted and included in the safety system in such a way that the presence of a non-secure state of its protective device brings about an interruption of the test signal path, wherein the interruption of the test signal path causes an absence of the test signal at the safety input of the safety control which e.g. leads to a safety related cutoff by the safety control in the framework of the safety system.

A safety related participant preferably comprises at least one signal transmission path which is arranged in the test signal path, in particular an electrical or optical signal transmission path which can be interrupted on the occurrence of a non-secure state of the associated protective device and in a secure state of the associated protective device is closed such that the test signal path can be closed and interrupted by means of a closure and an interruption of the signal transmission path.

This signal transmission path can, for example, be configured as an electrical switching path and comprise e.g. an electrical or electronic switch which in the secure state of the protective device can be present in its closed electrically conductive state and which in the non-secure state of the protective device is present in its opened electrically non-conductive state. An electrical switch preferably comprises a mechanical electrical switching contact which, for example, can be mechanically actuated, for example, a mechanically actuatable switching contact of a protective device configured as an emergency cutoff switch or which can be electrically actuatable, such as e.g. the switching contact of a safety relay. The switching contact can also be magnetically actuatable, such as e.g. the switching contact of a Reed switch which can, for example, be used for a protective device configured as a door closure and which can be enclosed and interrupted by closing and opening the door. An electronic switch preferably comprises an electronically controllable switch, such as e.g. a transistor, in particular a bipolar transistor or a field effect transistor. Such an electronic switch can be connected to a switching signal output of the protective device which transmits or provides a switching signal representing the secure or the non-secure state of the protective device, with the electronic switching being electronically controlled in dependence on the switching signal and being closed or opened in correspondence with the secure or the non-secure state of the protective device. The state represented by the switching signal, this means the secure or the non-secure state is thus electronically converted and imaged onto a closed or opened state of the signal transmission path interrupted by the switch. In this case the protective device can, for example, be configured as an optical protective device, such as e.g. a light barrier, a light grid or a laser scanner. The switching signal output can, in particular be configured as an active and/or a digital switching signal output and is preferably designed as a semiconductor-based switching signal output, such as e.g. an OSSD switching signal output and/or as a pnp semiconductor-based switching signal output.

An imaging of the switching state as previously described via a switching signal can also be used to image a closed state of a switch of the protective device onto an open state of the interruptible signal transmission path and vice versa, such that all protective devices having e.g. a switch can also be used which is open in a secure state of the protective device and is closed in the non-secure state. In this connection the switching state of the respective switch is imaged onto the respectively different switching state of the interruptible signal transmission path. The switch of the protective device and/or its forward path and return path then represents an, in particular passive switching signal output of the protective device, wherein a switching signal present at this switching signal output is used for the control of the associated interruptible signal transmission path.

The interruptible signal transmission path can further be an optical signal transmission path, for example, a light path defined by the transmitter or the receiver of a light barrier which e.g. extends through a spatial region to be protected and which can be interrupted by an object entering into the spatial region.

The protective devices can in principle be one-channeled protective devices or multi-channeled protective devices, this means protective devices with at least two-channels, this means protective devices having one or more protective channels, wherein a protective channel respectively preferably comprises a signal transmission path of the protective device closed or opened in dependence on the secure or non-secure state of the protective device or the switching signal output of the protective device indicating the secure or the non-secure state of the protective device. In the last case, the switching signal output preferably controls an interruptible signal transmission path of the safety related participant in order to open and to close this in dependence on the secure or non-secure state of the protective device, for example, an electrical or electronic switch, such as e.g. a field effect transistor. A plurality of protective channels of a protective device are preferably configured to together indicate the secure and the non-secure protective device for an error-free function, this means a change of the protective device between the secure and the non-secure state should lead to a triggering of and/or a change of the state of the protective channels of the protective device, this means to a substantially simultaneous and/or synchronous interruption or closure of both interruptible signal transmission paths and/or to a substantially simultaneous and/or synchronous change of the state of the protective device representing the switching signal outputs of this protective device. Thus, a redundant protective function of the protective device is ensured which increases the safety of the overall system.

The interruptible signal transmission paths of the same safety related participants and/or protective devices are preferably electrically connected to one another in series and arranged in the test signal path in such a way that a triggering of at least one protective channel interrupts the test signal path. A two-channeled protective device can, for example, comprise two electrical switching contacts which can be mechanically positively guided for the common change of their switching state. In contrast to this, in particular protective devices with two non-mechanical positively driven electrical switching contacts can also be used, for example, electrical switches having two Reed switch contacts. Preferably, protective devices with two equivalently switched electrical switching paths can be used, this means protective devices which are configured to either close or to open both switching paths, preferably at the same time in dependence on the secure or non-secure state of the protective device. The system can in principle also comprise at least one safety related participant or a protective device with two antivalently switching paths, this means a safety related participant and/or a protective device in which in the secure state a signal transmission path is closed and a different signal transmission path is opened while in the non-secure state the one signal transmission path is opened and the other signal transmission path is closed. Preferably, the switching state of at least one signal transmission path is converted and/or imaged as previously described onto the opposite switching state of a further interruptible signal transmission path in such a way that at least two equivalently switching signal transmission paths are in turn present in the safety related participants which can preferably be interrupted together on the occurrence of a non-secure state.

In accordance with an embodiment of the safety system which is described in detail in connection with the description of the Figures, a safety related participant comprises a protective device and at least a first and second interruptible signal transmission path which can be interrupted together on the occurrence of a non-secure state of the protective device. The two interruptible signal transmission paths are connected to one another in series and are arranged in the test signal path. The safety related participant further comprises an interruption switch arranged in the test signal path as well as an evaluation unit. The evaluation unit is connected to the first signal transmission path and/or—in the case of use of a protective device having a first switching signal output controlling the interruptible first signal transmission path—is optionally connected to this switching signal output of the protective device. The evaluation unit is further connected to the second signal transmission path and/or—in the case of use of a protective device having a second switching signal output controlling the second interruptible signal transmission path—is optionally connected to this second switching signal output. This connection enables the evaluation unit to determine the state, or a change of the state, of the interruptible signal transmission path and/or a state of the protective device represented by the switching signal output. The evaluation unit is adapted to, preferably continuously, check whether the first and second signal transmission paths are interrupted together or can be controlled together for the interruption by a corresponding switching signal output and in order to open the interruption switch when the first and second interruptible signal transmission paths are together not interrupted or controlled for the interruption.

It can thereby be locally recognized at the safety related participant when the desired common switchability of the two interruptible signal transmission paths is no longer ensured, but rather a discrepancy of the two protective channels and thus an erroneous function of the safety related participant is present which is also referred to as a discrepancy error. Such an erroneous function can, for example, be brought about by a fusing of one of the switching contacts of the protective devices which prevents an error-free opening of the switching contact on the occurrence of a non-secure state of the protective device or by an erroneous function of a switching signal output of the protective device, for example, when this continuously represents a secure state of the protective device. The check carried out by the local evaluation unit represents an important additional protective function. Indeed, an interruption of the test signal path and thus a safety related cutoff is brought about, also for an error-free triggering of only one protective channel, this means for only one of the interruptible signal transmission paths as a consequence of the series circuit of the two signal transmission paths in the test signal path, however, the redundancy brought about by the provision of two interruptible signal transmission paths and the thereby inherent increased security is lost. The recognition of errors through the evaluation unit prevents a first error, in the form of such an erroneous function of a protective channel remaining undetected and tolerated and thereby that a possibility of an error increase is brought about in such a way that an erroneous function of the other protective channel leads to a complete loss of the securing function of the safety related participants.

The evaluation unit can also serve to recognize a line error, such as, in particular a short-circuit or a cross-circuit which can be present in one or more connection lines which connect the different protective channels of the protective device to an interconnection module explained in the following in more detail in which the evaluation unit is preferably received. A connection line can, for example, comprise a switching signal line which connects a previously described switching signal output of the protective device to the interconnection module or a forward line or a return line between which a respectively interruptible signal transmission path of a protective device is switched in series.

In order to check the switching state of the interruptible signal transmission paths, the evaluation unit can e.g. be respectively connected to a forward line and a return line between which the respective interruptible signal transmission paths are switched in series. The forward line and the return line in this connection can be a part of an interconnection line and can serve to connect the interruptible signal transmission path which can e.g. be a part of the protective device, to an interconnection module described in the following in which the evaluation unit is arranged. In this case the evaluation unit can also recognize a line error, such as, in particular a short-circuit or a cross-circuit between the forward lines and the return lines. For example, a short-circuit between the forward line and the return line of an interruptible signal transmission path or also a cross-circuit between the forward line or the return line of an interruptible signal transmission path and the forward line or the return line of the other signal transmission path can appear as a continuously closed first or second signal transmission path from the point of view of the evaluation unit and for this reason can lead to a discrepancy error like for a fused switching contact in such a way that the evaluation unit can also recognize such an error. This recognition of line errors by means of the evaluation unit can enable the danger-free routing of a plurality of connection lines and/or forward lines and return lines of an, in particular multi-channel protective device in a common interconnection cable.

The evaluation unit is preferably arranged in a housing of the safety related participant, for example a housing according to the housing protective type IP 67 or IP 20.

In accordance with an advantageous embodiment the evaluation unit is configured to check whether the first and the second signal transmission paths of the safety related participant are simultaneously interrupted or are controlled for interruption at least up to and within a predefinable discrepancy time. Likewise the evaluation unit can be configured to check whether the signal transmission paths are simultaneously closed or are controlled for closure up to and within a predefinable discrepancy time, for example, on activation of, or a restart of, the safety system. Such a monitoring of the start can be realized separately from the monitoring of the common interruption of the signal transmission path. In order to monitor the simultaneousness of the interruption or control for the interruption and/or the simultaneousness of the closure or control for the closure, the evaluation unit can, for example, comprise a correspondingly adapted microprocessor and/or an own time base, such as, for example, a clock generator of the microprocessor.

The evaluation unit preferably realizes a restart lock for the safety-critical plant following a discrepancy error recognized by the evaluation unit. In this connection the evaluation unit can be adapted to open and to only close the interruption switch, then when the two signal transmission paths are not interrupted together or have together been controlled for the interruption and when a removal of the recognized error and/or corresponding error acknowledgement has taken place. In this connection, the evaluation unit does not already switch the interrupted switch when the protective device takes on its secure state and the two signal transmission paths have been closed again or have been controlled for closure. Thereby the error that one of the two interruptible signal transmission paths was continuously closed or controlled for closure has namely not been remedied. Rather more in this case, at least generally, an exchange of the safety related participant and/or, in particular of the protective device is required before the restart of the safety system and of the plant can be enabled by a closure of the interruption switch.

The safety related participant can enable a user to acknowledge the error locally at the safety related participant, for example, via an input element present at the safety related participant after the exchange of the defective protective device. The interruption switch can then be held open for so long up until such an error acknowledgement has taken place through the user.

The evaluation unit can also be adapted, for the recognition of a remedy of the error, such as e.g. an exchange of the protective device, to check whether a complete orderly switching sequence follows an error recognition, such as the previously described error recognition, and whether an opening of the interruption switch took place and in this case to acknowledge the error. Such a switching sequence consists therein that the at least two interruptible signal transmission paths of the safety related participant are both opened together and/or controlled together for the opening and can subsequently be closed together and/or can together be controlled for closure tasks. Following such a recognition the evaluation unit can then close the interruption switch again in such a way that a restart of the safety system and the plant associated therewith is enabled.

A check of an orderly switching sequence can, in particular comprise the fact that it is checked whether the opening and/or control for the opening of the signal transmission path takes place simultaneously at least in the scope of a predefined discrepancy time and/or in that it is checked whether the closure and/or control for closure of the signal transmission path takes place simultaneously at least within the scope of a predefined discrepancy time.

The safety related participant can comprise a messaging unit which is configured to generate a communication perceptible for a user, such as e.g. a visual display, for example, to indicate a recognized error to the user, in dependence on the check carried out by the evaluation unit of whether the two signal transmission paths are interrupted together or are together controlled for interruption. Alternatively or additionally the safety related participant can be configured to transmit a corresponding message to the safety control by means of a data communication in the case of such an error, said message indicating the error.

In addition to the first and the second interruptible signal transmission paths the safety related participant can have one or more further interruptible signal transmission paths which can be interrupted on the occurrence of a non-secure state of the protective device together with the first and second interruptible signal transmission paths. The evaluation unit then preferably checks whether all common interruptible signal transmission paths of the signal transmitter are together interrupted or controlled together for interruption and otherwise opens the interruption switch.

A safety related participant as described herein can in principle be completely formed by a protective device which provides the herein described functions. Preferably, at least one of the safety related participants, however, additionally comprises an interconnection module in addition to the protective device via which interconnection module the safety related participant is included into the safety system. The interconnection module and the protective device can be arranged in separate housings and/or can be connected to one another via an interconnection line which can comprise at least one interconnection cable. Such a separate interconnection module can be directly connected to the bus line in order to include the safety related participant in the test signal path. Such an interconnection module enables the installation of the already present protective devices into the safety system in accordance with the invention in a simple manner and in this respect to realize the herein described functions. For example, the interconnection module can comprise a logic unit in particular realized by a microprocessor, which is connected to the test signal path and/or to the data path and controls the herein described data communication between the safety related participants and the safety control, wherein the logic unit can, in particular be used as a transmission and reception unit. The microprocessor can be connected to a clock generator which clocks the microprocessor and uses this clock in the framework of the data communication for the synchronization of the readout and transmission of data to and from the safety related participants. The interconnection module can further comprise an evaluation unit such as the previously described evaluation unit which is realized e.g. by a further microprocessor or by the previously mentioned microprocessor.

As was previously described the protective device itself can have a signal transmission path interruptible on the occurrence of a non-secure state of the protective device, for example, an electrical switching contact or an interruptible light barrier. When the protective device itself has an interruptible signal transmission path, the interconnection module can include the interruptible signal transmission path in the safety system in such a way that it connects this between the protective device and the interconnection module to the test signal path, preferably via an interconnection cable, such that the interruptible signal transmission path is a direct component of the test signal path and the test signal uses the interruptible signal transmission path as a direct transmission path. In accordance with an advantageous embodiment the interruptible safety transmission path of the safety related participant comprises a switch arranged in the protective device which is included in the test signal path via a forward line and a return line, wherein the forward line and the return line are arranged in an interconnection line connecting the protective device and the interconnection module. The forward line and the return line of a signal transmission path can in this connection be respectively guided in different interconnection cables of the same interconnection line in order to avoid short-circuits, in particular when it is a one-channeled protective device. The forward line and the return line of at least one and preferably of at least two interruptible signal transmission paths of a preferably at least two-channeled protective device, by way of contrast, can also be arranged in a common interconnection cable of the interconnection line in order to reduce the cabling demand.

Likewise the protective device can have an active or a passive switching signal output, in particular a digital switching signal output, such as e.g. an OSSD output, at which a switching signal is output and/or is present which represents the secure or non-secure state of the protective device.

When the protective device comprises a switching signal output representing the secure or the non-secure state of the protective device, then the interruptible signal transmission path of the safety related participant is preferably arranged in the interconnection module and is, for example, formed by an electronic switch. This is then preferably connected via an interconnection cable to the switching signal output of the protective device and is controlled in dependence on the switching signal present at the switching signal output in order to take on the secure and/or non-secure state of the protective device corresponding to the closed and/or the opened state.

In accordance with an advantageous embodiment, which is explained in more detail in connection with the description of the Figures, the interconnection module comprises a test signal input for an incoming test signal and a test signal output for an outgoing test signal. The protective device connected to the interconnection module via an interconnection line comprises at least a first and a second switch which are respectively connected to the interconnection module via a forward line and a return line of the interconnection line of the safety related participant. Each switch in this connection forms an interruptible electrical switching path with the associated forward line and return line, with the electrical switching path being switched in series in the test signal path via a test circuit described in the following.

The interconnection module comprises a test circuit for the two switching paths which comprise a controlled current source, a controlled current sink and a current directing element. The test circuit for the two switching paths serves the purpose, of interrupting the signal transmitted via the test signal path or to respectively output a test signal at the test signal output which reliably leads to a violation of the expectation of the safety control in the case of an open state of at least one of the two switches and in the case of a cross-circuit between the two switching paths in the interconnection line arranged between the interconnection module and the protective device.

For this purpose the test signal input of the interconnection module is connected to a control input of the controlled current source or of the controlled current sink in such a way that the controlled current source or current sink is controlled by the incoming test signal or a signal derived therefrom, wherein a controlled output of the same one of the current source and the current sink is connected to the forward line of the first switching path in order to transmit a current via the first switching path. The return line of the first switching path is connected to the control input of the respectively other one of the controlled current source and the controlled current sink in such a way that the controlled current source or current sink can be controlled by the current signal transmitted via the first switching path or by a signal derived therefrom. The controlled output of the other one of the controlled current source and current sink is connected to the forward line of the second switching path in order to transmit a current via the second switching path. In this connection the return line of the second switching path is connected to a current directing element which is configured to provide a signal dependent on the current transmitted via the second switching path, in particular on its orientation. The test signal output of the interconnection module is connected to the current directing element in order to output the signal generated by the current directing element or a signal derived therefrom as an outgoing test signal of the safety related participants.

The protective device can also comprise one or more further switches in addition to the first and the second switch which can be included in the test signal path in series, for example, via the test circuit, for the formation of an electrical switching path in such a way that they close or interrupt the test signal path in dependence on their switching state.

The recognition of a cross-circuit between the two switching paths brought about by the previously described test circuit is based on the recognition that in the error-free operation and in the secure state of the protective device the current is driven through the two switching paths in different directions, since the current is driven through one of the electrical switching paths by a current source which generates an outgoing electrical current flow and the current is driven through the other electrical switching path by the current sink which generates an incoming electrical current flow. For this reason a cross-circuit between both switching paths leads to a change in direction of the current flow in the electrical switching path connected to the current directing element or at least to a reduction of the current flowing in the expected current flow direction in comparison to an error-free operation, this means in absence of a cross-circuit between both switching paths. The current directing element can recognize the presence of such a deviation of the current flow from the current flow of an error free operation and can ensure that a test signal is output and/or present at the test signal output of the safety related participant which deviates from the test signal transmitted during the error-free operation and which violates the expectation of the safety control and thus leads to an activation of the safety function.

The safety system preferably comprises at least one electrical current supply unit which provides an electrical voltage for the current supply of one or more consumers of electrical power in the safety system, wherein the safety control, the safety related participants and/or the termination element represent the consumers of the safety system. For this purpose the safety system comprises a first and a second electrical current supply line between which the electrical voltage is made available and via which one or more consumers is/are electrically conductively connected to the current supply unit. The first and second electrical current supply lines are preferably respectively arranged in the bus line and/or in the bus cables of the bus line. Thereby a simple energy supply concept results on the use of a common bus line with a correspondingly low demand in cabling.

In accordance with an advantageous embodiment the safety system comprises a plurality of separate electrical current supply units which respectively provide an electrical voltage for the current supply of at least one consumer. In this connection the safety system is divided into segments each having one or more consumers which are respectively associated with a current supply unit and which each have a first current supply line and a second current supply line via which the one or more consumers of the respective segment are electrically conductively connected to the associated current supply unit and between which the electrical voltage of the associated current supply unit is made available. In this connection the first current supply line and the second current supply line of a segment are each not directly electrically conductively connected to the first current supply line and the second current supply line of a different segment and are preferably separated from the first current supply line and the second current supply line of the other segment in a galvanic manner.

The electrical securing of the bus system with respect to dangerous over-currents is considerably simplified and the electrical safety of the bus system is increased through this segmentation of the safety system with respect to the energy supply. The current flow in each segment of the safety system is substantially only influenced by the consumer arranged in the respective segment, due to the absence of a direct electrical connection between the first and the second current supply lines of different segments and/or the galvanic separation between these current supply lines between the segments. Thereby the maximum current intensity expected in the first and second current supply lines, as well as the expected fluctuations of the current intensity in this current supply line are reduced. An electrical safe guarding which ensures the required safety is realizable with simple means, since these only have to be designed with respect to low maximum current flows and small fluctuations of the current flow. The different segments can be considered separate from one another with respect to the supply of energy and the electrical safe guarding on the design and/or implementation of the safety system, wherein only the consumers of a respective segment have to be considered on the design of the supply of energy and the electrical safe guarding of a segment. The design and/or planning of a safety system having an energy supply concept satisfying these requirements and having a high safety with respect to the electrical safe guarding against over-currents is thereby considerably simplified. Furthermore, galvanic interactions between the current supply lines of separate segments can be eliminated and the influence of electromagnetic interference influences on the operation of the safety system is reduced and thereby the electromagnetic tolerance (EMT) of the safety system is considerably increased.

The fact that the current supply lines of different segments are not directly electrically conductively connected to one another is to be understood such that the current supply lines of the different segments are separate from one another, this means these are not configured as a single current supply line, at least they are not in contact with one another in an electrically conductive manner in the low ohm region. A galvanic separation is to be understood such that no galvanic connection and/or coupling between the current supply lines is present, this means that no connection and/or coupling between the current supply lines is present which is capable of conducting electricity. A possibly present galvanic coupling of the current supply lines to one another via the superordinate supply grid by means of which the current supply units are connected to one another at the input side for their own power supply and current supply, possibly in a galvanic manner is in this connection not necessarily considered, this means that the galvanic separation relates to the bus system connected to the supply grid. However, also at least one current supply unit can be used which ensures a galvanic separation of the current supply lines from the current supply grid, such as, for example, a power supply having a transformer in such a way that also such a galvanic coupling is avoided and an absolute galvanic separation of the current supply lines can be ensured.

In principle one or more segments of the system can respectively be formed by exactly one consumer. However, the system preferably comprises one or more segments which each comprise at least two consumers. A reduced material and cabling demand for the current supply is ensured through the supply of a plurality of consumers of one segment by means of a common current supply unit. At the same time a degradation of the electrical safety or the interference freedom on the operation of the bus system is prevented in such a way that overall a secure and reliable and at the same time easy to realize bus system is generated through the separation of the current supply lines.

The current supply unit of a segment and of a consumer of the associated segment can be integrated into a common device. The current supply unit and the consumer of the segment can, however, likewise also be realized as separate devices which are connected to one another via respective current supply lines.

Preferably, at least one of the bus signal paths, i.e. the forward path, the return path and/or the data return path also respectively have a plurality of sections which are coupled to one another in a signal-transmitting manner and a non-galvanic manner, in particular in an optical, inductive or capacitive manner by means of a coupling unit. The sections of the bus signal path coupled to one another in a non-galvanic manner via the coupling unit are preferably also separated from one another in a galvanic manner in this connection. Thereby, the electromagnetic tolerance is even further increased.

Two sections of the forward path, the return path and/or the data return path can be associated with different segments in this connection and can be electrically conductively connected to one or more and preferably to all consumers of the associated segment.

Preferably, at least two and preferably all consumers of a segment are connected to the current supply unit associated with the segment starting from the associated current supply unit via the first and/or the second current supply line of the segment in a series one after the other. Furthermore, it is preferred when the first and/or the second current supply line of a segment are at least regionally arranged in the bus line, preferably in a bus cable.

A segmented safety system as described above comprises at least one feed module which is associated with one segment of the safety system and via which the associated current supply unit is connected to the segment for the provision of the electric voltage and, in particular is connected to one or more consumers of this segment of the safety system connected to the feed module. In this connection the feed module itself preferably represents a consumer of the segment which is, in particular connected to the bus line of the bus system. In principle the feed module can represent the single consumer of a segment having precisely one consumer. However, the segment preferably also comprises one or more further consumers in addition to the feed module which are connected to the current supply unit via the feed module as previously described.

The feed module can be connected to both the first and the second current supply line of the segment of the safety system associated with the feed module and can be connected to the first and/or the second current supply line of an adjacent segment of the safety system and the current supply lines of the different segments can be separated from one another in a non galvanic manner in the feed module. Thereby the cabling of the components of the safety system is further simplified.

Preferably the feed module has a coupling unit as previously described for the signal transmitting and non-galvanic coupling of two sections of at least one bus signal path which are preferably separated from one another in a non galvanic manner. In this connection a section of the bus signal path is preferably electrically conductively connected to one or more consumers of the segment associated with the feed module and the other section is preferably electrically conductively connected to one or more consumers of a segment adjacent thereto.

The safety input of the safety control preferably comprises a secure input. The safety input can in this connection itself be formed by a secure input of a safety control or, in the case of a modular composition of the safety control, be composed of a safety module and a connection module connected thereto by one input of the connection module connected to a secure input of the safety module. The secure input is characterized by an error-safe evaluation of the incoming signal in the safety control for which purpose, for example, a two-channeled evaluation can take place which is carried out e.g. by two microprocessors working in parallel to one another in a redundant manner and controlling one another.

The safety system and the herein described safety functions preferably satisfy the safety level SIL 3 in accordance to the norm IEC 61508 and/or the safety level performance level e ("PL e") in accordance with the norm EN ISO 13849-1.

The invention also relates to a termination element in accordance with claim 14 which is configured for the use in a safety system in accordance with the invention as described herein. The advantageous embodiments of the termination element and the corresponding advantages described with reference to the safety system in accordance with the invention are correspondingly true.

The termination element in accordance with the invention has an input for connection to the forward path of the test signal path and an output for connection to the return path of the test signal path of the safety system and is configured to receive the signal present at its input and to output a test signal to the return path of the test signal path in dependence on the received signal, said signal being changed with respect to the received signal. In this connection, the termination element is configured to transmit a test signal synchronized to a signal present at its input and to use an own time basis of the termination element, such as, e.g. a clock generator of a microprocessor of the termination element.

The termination element is preferably adapted in such a way that the output of the test signal only depends on the signal received at the input of the termination element, this means the termination element itself e.g. does not comprises a signal transmission path which could be interrupted by other outer influences by means of which the test signal path and/or the test signal can be interrupted.

Figure 3:
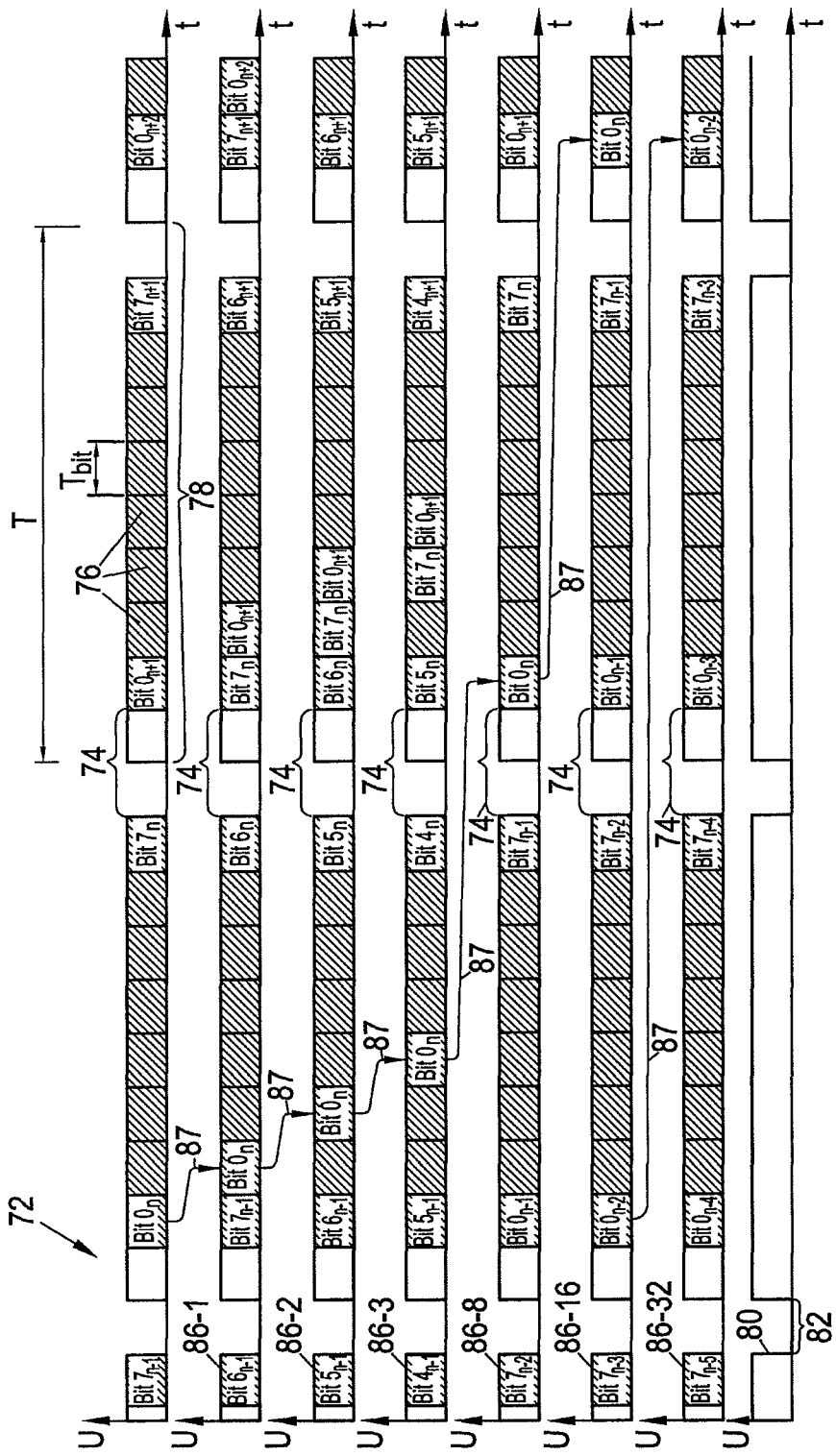
Figure 4:
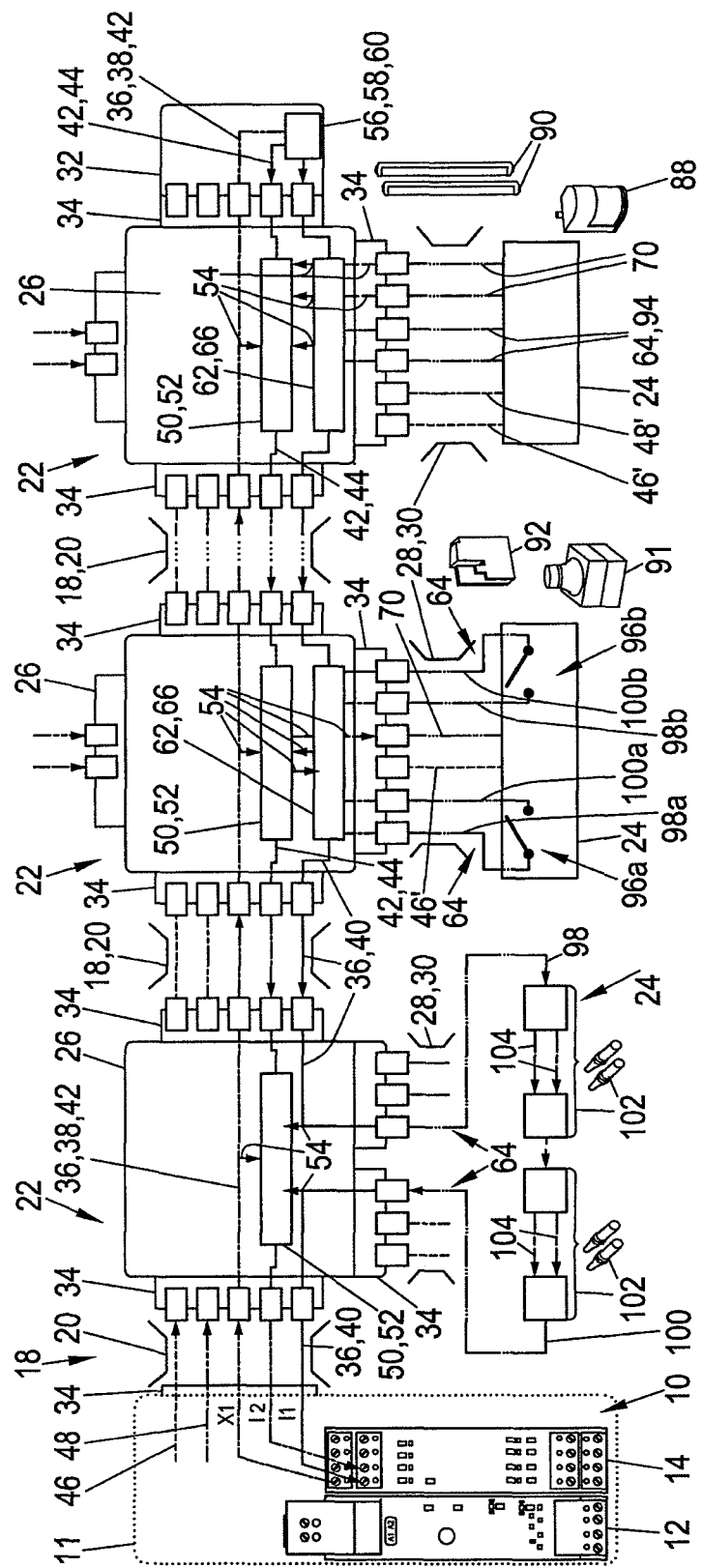
Figure 5:
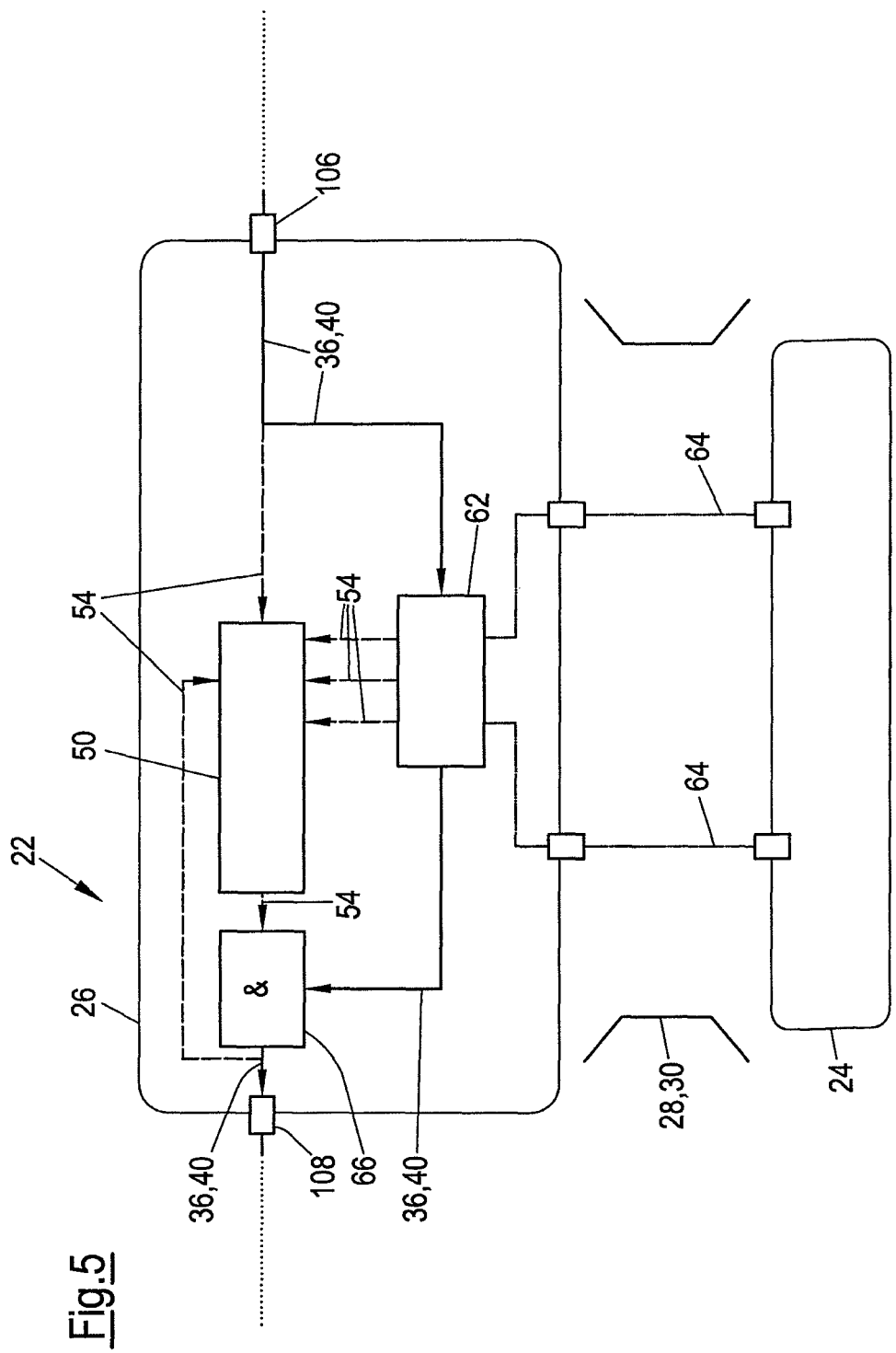
Figure 6:
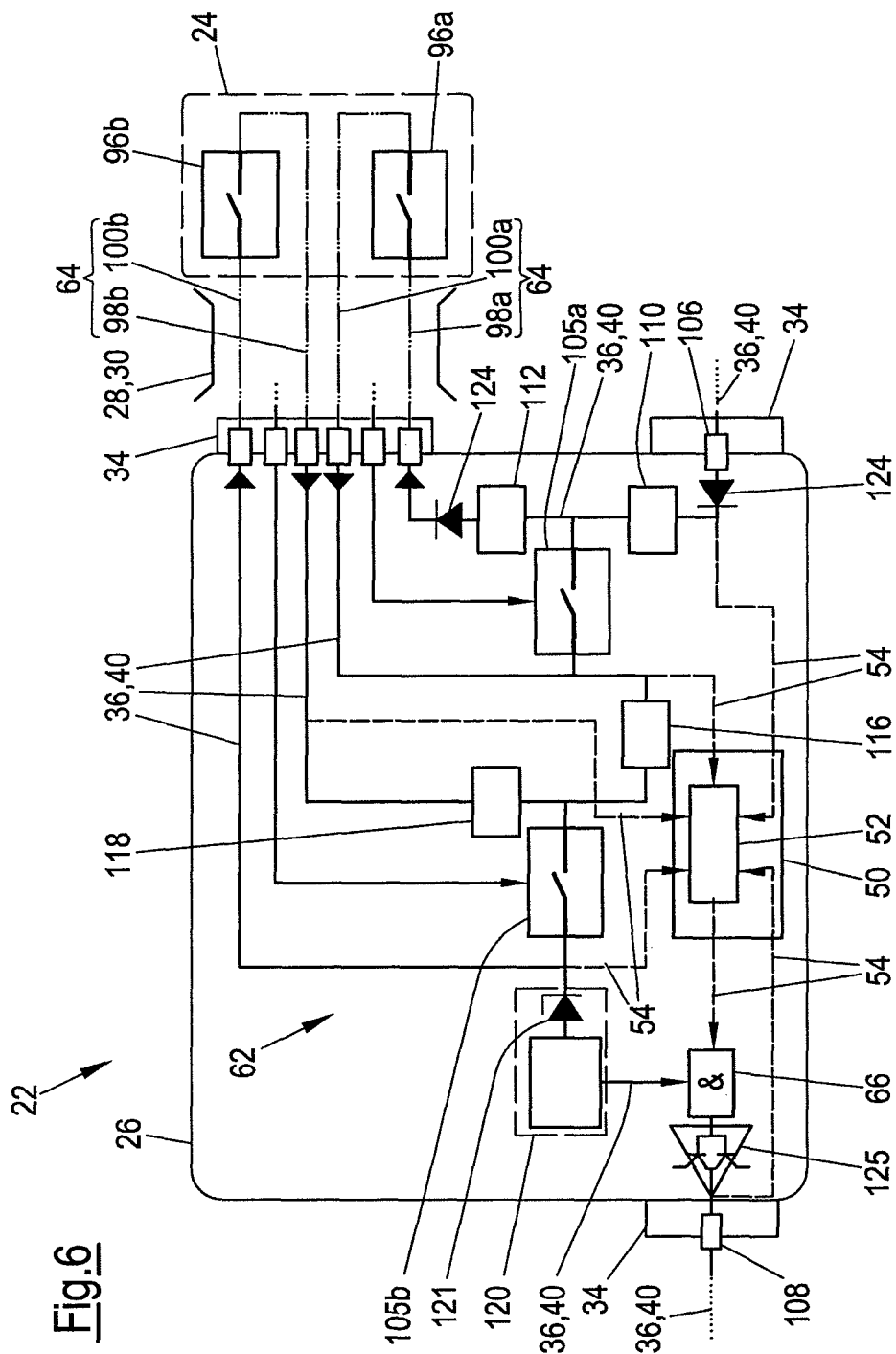
Figure 7:
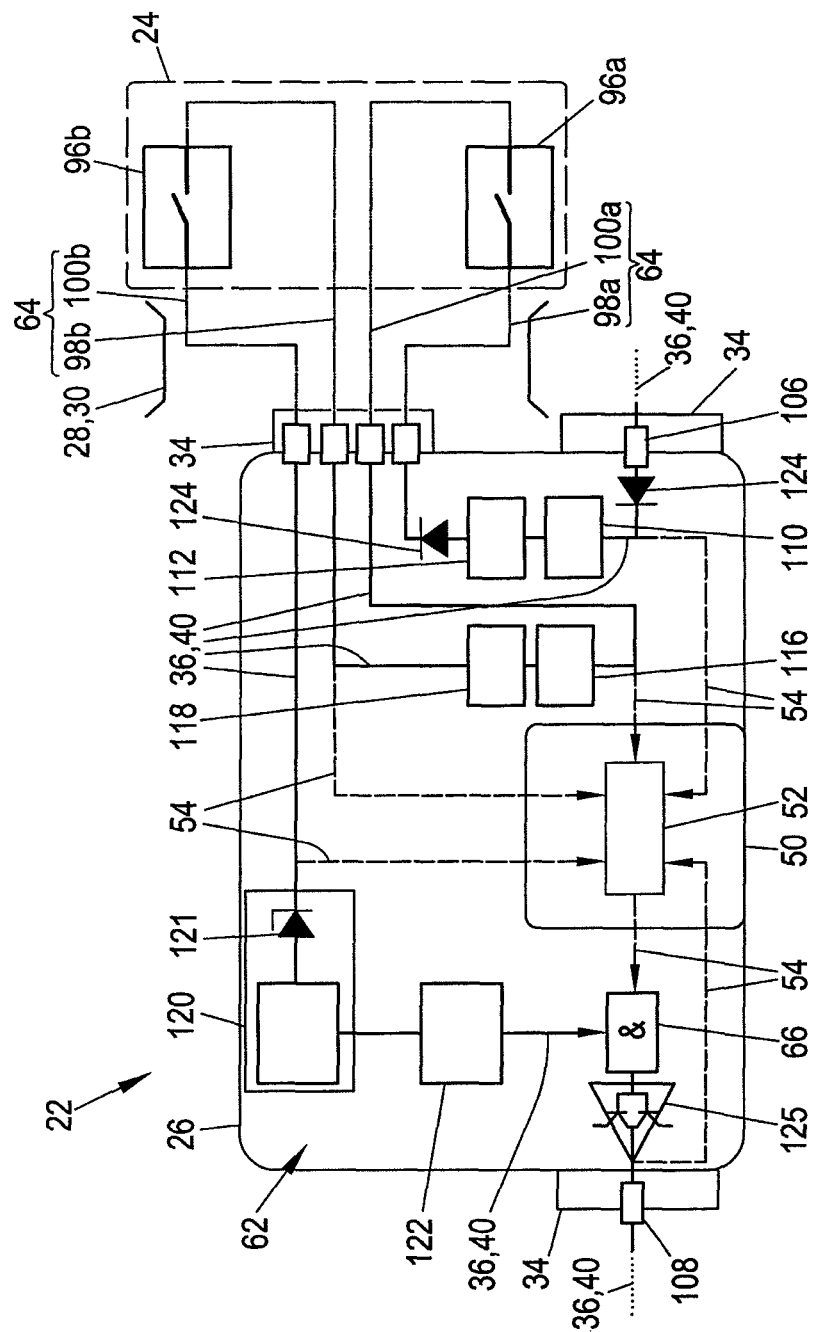
Figure 8:
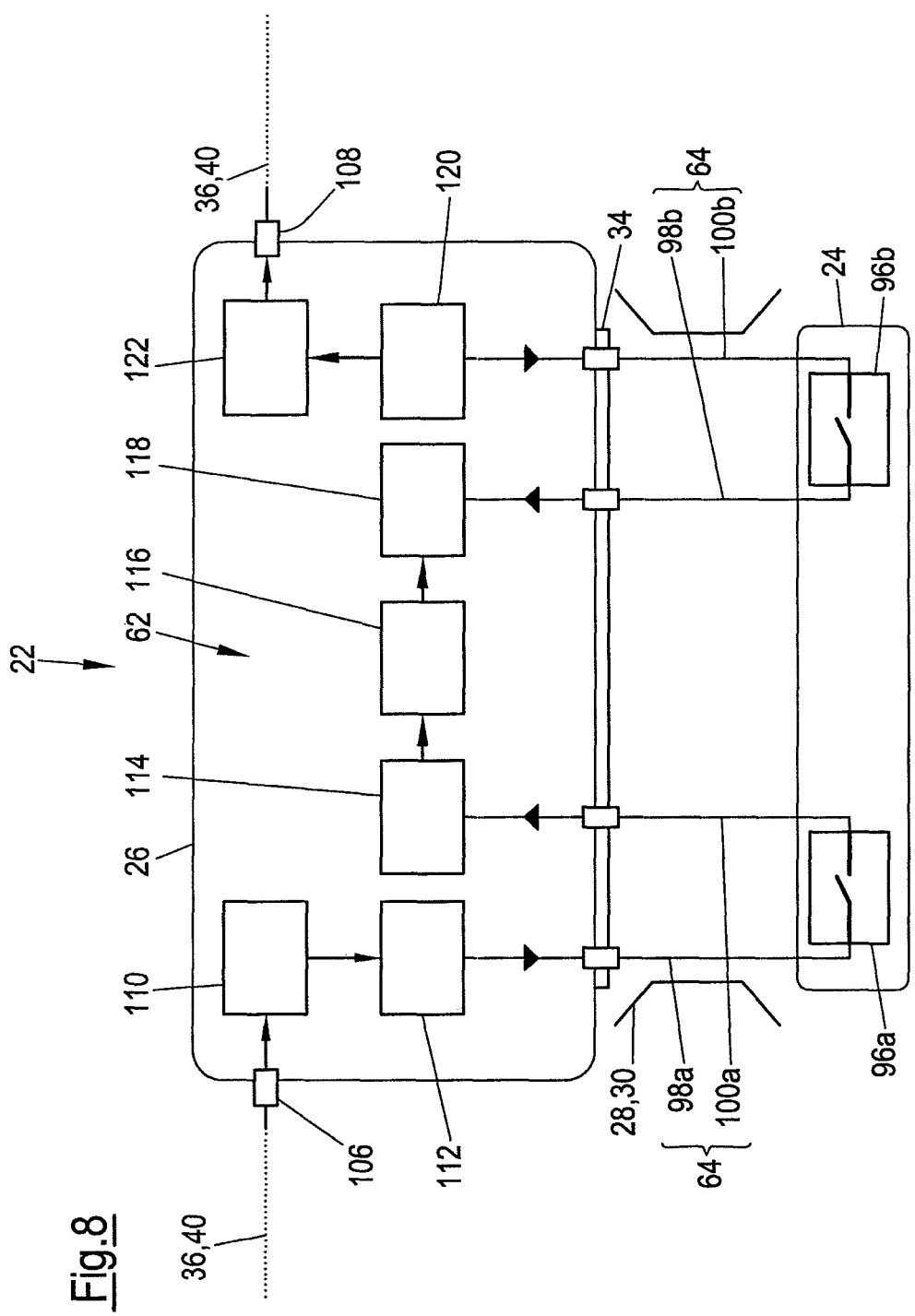
Figure 9:
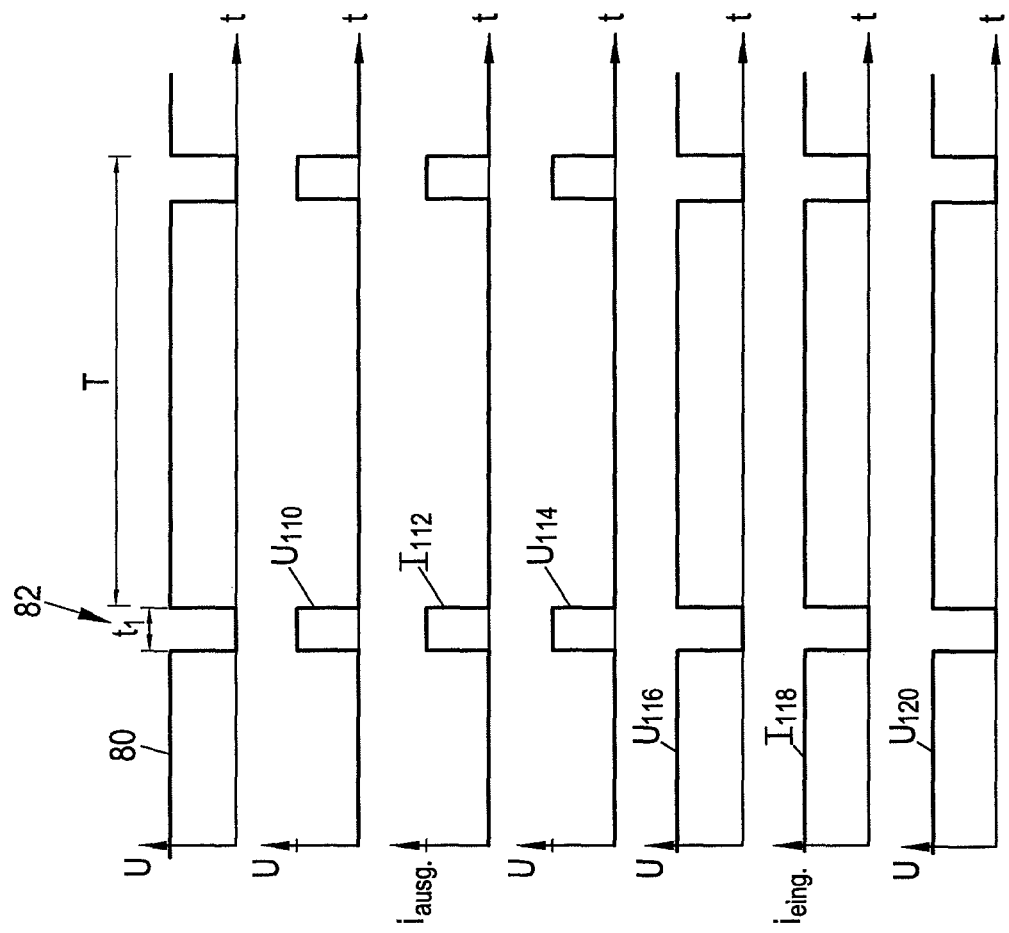
Figure 10:
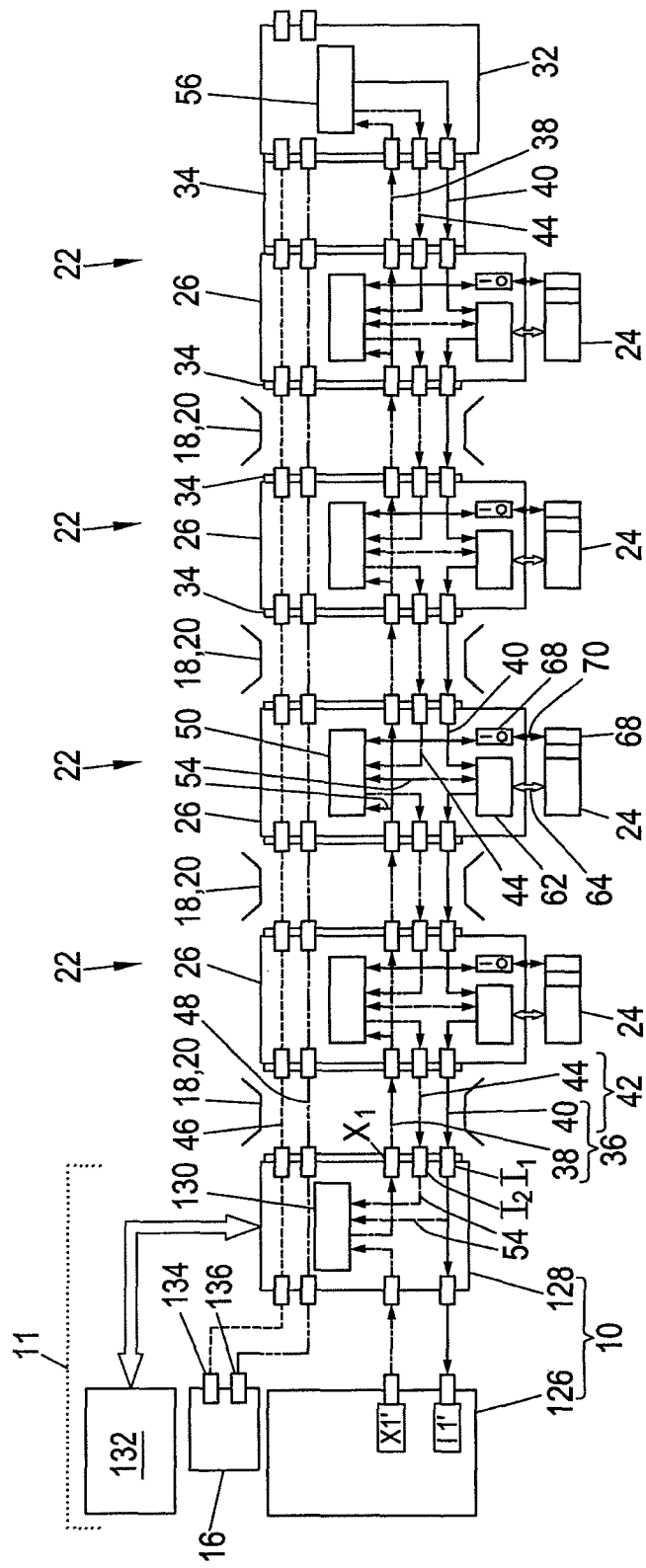
Figure 11:
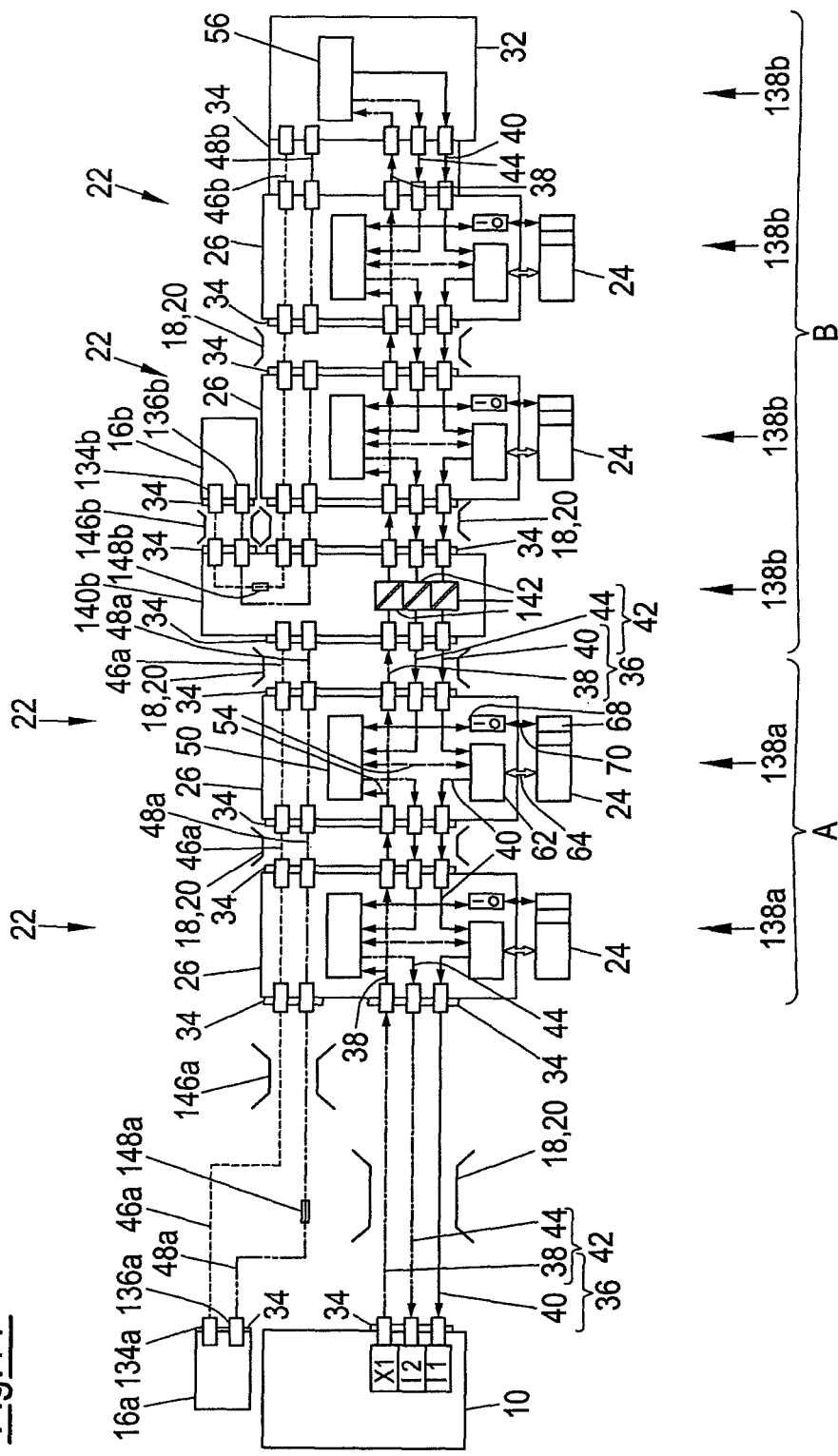

In the following the invention will be described by way of example with reference to advantageous embodiments and with respect to the submitted drawings. There is shown:

FIG. 1 a safety system in accordance with an embodiment of the invention;

FIG. 2a, b an exemplary output signal (FIG. 2a) and a test signal (FIG. 2b) which are transmitted on the operation of the safety system of FIG. 1;

FIG. 3 an exemplary output signal and data signals which are transmitted on the operation of the safety system of FIG. 1;

FIG. 4 a further schematic illustration of the safety system of FIG. 1;

FIG. 5 a schematic illustration of a safety related participant having an evaluation unit;

FIG. 6 a schematic illustration of a safety related participant having an evaluation unit and a test circuit;

FIG. 7 a schematic illustration of a further safety related participant having an evaluation unit and a test circuit;

FIG. 8 a schematic illustration of a safety related participant having a test circuit;

FIG. 9 examples of current and voltage signals transmitted by the test circuit of the safety related participant of FIG. 8;

FIG. 10 a schematic illustration of a further safety system in accordance with the invention; and FIG. 11 a schematic illustration of a further safety system in accordance with the invention having an improved current supply.

FIG. 1 shows a safety system in accordance with an embodiment of the invention, wherein the upper part of the combined illustration in FIG. 1 is a schematic view and the lower part of the combined illustration in FIG. 1 is a substantially photographic view of the same safety system. Elements corresponding to one another in the two illustrations bear the same reference numerals.

The safety system comprises a safety control 10, which is arranged in a switching cabinet 11 and comprises a main module 12 and an input/output module 14 which are connected to one another via a non-illustrated bus bar, wherein the input/output module 14 has an output X1, a safety input I1, as well as a non-secure standard input I2. A current supply unit 16 for the current supply of the safety system is further arranged in the switching cabinet 11 as a power supply, for example a switching power supply, which provides a constant direct voltage potential having a high level of e.g. 24 Volts with respect to ground and a ground potential and/or a constant direct voltage potential having a low level of e.g. 0 Volt with respect to ground, wherein the potential having the high level is supplied at a connection A1 of the main module 12 and the potential having the low level is supplied at a connection A2 of the main module 12.

The safety system comprises a bus line 18 having a plurality of bus cables 20, wherein one of the bus cables 20 is connected to the safety control 10. The safety system further comprises a plurality of safety related participants 22 which are connected in a line one after the other via the bus cable 20 and are connected to the safety control 10 via the bus line 18. The safety related participants 22 respectively comprise a protective device 24 and an interconnection module 26 which is connected to the respective protective device 24 by an interconnection line 30 formed by an interconnection cable 28 and which is directly connected to the respectively adjacent bus cables 20. A termination element 32 is present at the end of the line formed by the safety related participants 22 which termination element is directly connected to the last safety related participant 22 of the line in this example, this means without a cable being connected there between. In principle, the termination element 32 could also be connected to the bus line 18 by means of a further bus cable.

A cable is illustrated in the Figures in principle by two respective brackets facing one another which represent the jacket of the cable, wherein generally one of the brackets is provided with the corresponding reference numeral, this means the reference numeral 20 for a bus cable, the reference numeral 28 for an interconnection cable or one of the reference numerals 146a, 146b for an electric cable shown in FIG. 11. The lines respectively drawn in between the brackets of a cable respectively represent an electrical line arranged in the respective cable which can be composed of one or more electrical line conductors arranged in the cable jacket.

The safety system is configured as a field bus system, this means that components of the safety system, in particular the safety related participants 22 and the termination element 32 are arranged locally distributed. The spacing between two different safety related participants 22 can in this connection be considerable and e.g. amount to one or more meters. The connection of the safety control 10, the protective devices 24 and the interconnection modules 26 to the bus cables 20, the interconnection cables 28 and the termination element 32 are exemplary respectively formed by an electrical plug connection 34 in the present embodiment which is composed of a male plug of the one element, e.g. of the type M12 and a corresponding female plug of the other element. The protective device 24, the interconnection modules 26 and the termination element 32 respectively have an own housing which is preferably configured in accordance with the housing protective type IP 67 or IP 20 or a different housing protective type protecting against contamination or humidity. The bus cables 20 run outside of the housing and are formed as standard sensor/actor cables protecting against contamination or humidity which are suitable and allowable for the laying outside of housings, for example of the type M12, having a conductor cross-section and/or conductor cross-section of preferably at least 0.34 mm². The distances between the safety related participants 22 can e.g. amount to one or more meters and correspond to a length of a bus cable 20.

The bus line 18 and the safety related participants 22 connected to the bus line 18 form a test signal path 36 having a forward path 38 connected to the output X1 of the safety control 10 and having a return path 40 connected to the safety input I1 of the safety control 10, wherein the forward path 38 and the return path 40 are connected to one another via the termination element 32 and both the forward path 38 and the return path 40 run through the safety related participants 22. Furthermore, the safety related participants 22, the bus line 18 and the termination element 32 form a data path 42 which has a data forward path formed by the forward path 38 of the test signal path, this means this is identical to the data forward path and has a separate data return path 44 connected to the input I2 of the safety control 10 which together form a ring bus line. Furthermore, a first current supply line 46 guided via the connection A1 of the main module and a second current supply line 48 guided via the connection A2 of the main module are provided via which the safety control 10, the safety related participants 22 and the termination element 32 can be supplied with current. As is shown in FIG. 1, the interconnection cables 28 can respectively comprise a first and a second current supply conductor 46', 48' (for reasons of clarity these elements were only provided with reference numerals for the right safety related participant 22 of FIG. 1), via which the respective protective device 24 can be connected to the first and second current supply line 46, 48 and can thereby be supplied with a current.

As is shown in FIG. 1 the test signal path 36, the data path 42, the first current supply line 46 and the second current supply line 48 are arranged in the common bus line 18 and are all guided in the same common bus cable 20 of the bus line 18. In this connection, the bus cables 20 each have an electrically conductive conductor for the forward path 38 of the test signal path 36 which simultaneously represents the data forward path for the data return path 44, for the first current supply line 46 and for the second current supply line 48 so that the complete cabling of the safety related participants 22 to the safety control 10 is realized by a line-shaped bus line 18 composed of bus cables 20 each having at least five conductors. Thus, only one bus cable 20 is required in order to connect two adjacent safety related participants 22 to one another and/or to the safety control 10.

An output signal is generated by the safety control 10 and is transmitted to the forward path 38 via the output X1. This output signal is directly looped through substantially unchanged and without the possibility of interruption by the interconnection modules 26 of the safety related participants 22, as is evident from FIG. 1, and is substantially transmitted unchanged up to the termination element 32. At the same time a respective logic unit 50 having a microprocessor 52 is provided in the interconnection modules 26 which logic unit is connected to the forward path 38 via a signal path 52 and is adapted to monitor the output signal transmitted via the forward path 38, for example, to carry out a synchronization as explained in detail in the following.

The termination element 32 has a logic unit 56 having a microprocessor 58 connected to the forward path 38 which logic unit receives and evaluates the output signal transmitted via the forward path 38. The logic unit 56 is connected to a test signal generator 60 of the termination element 32 and controls this in order to actively generate a test signal and to transmit this in a signal driving manner to the return path 40 of the test signal path 36 connected to the test signal generator 60.

The return path 40 of the test signal path 36 runs through the safety related participants 22. These are adapted to interrupt the return path 40 on the presence and/or occurrence of a non-secure state of their respective protective device 24. The interconnection modules 26 each have a test circuit 62 which is connected to the protective channels of the respective protective device 24 via connections 64 of the interconnection line 30, wherein the test circuit 62 brings about an interruption of the return path 40 of the test signal path 36 on the presence of a non-secure state of the protective device 24 in cooperation with the protective channels of the protective device 24.

The interconnection modules 26 further respectively comprise an interruption switch 66 which is likewise configured for the interruption of the return path 40 of the test signal path 36 and which is controlled, as will be described in the following in more detail, by the logic unit 50—also referred to as an evaluation unit in this connection—and to which logic unit the interruption switch is connected via a signal path 54.

The logic units 56, 50 of the termination element 32 and the interconnection modules 26 are respectively arranged in the data path 42 and/or the data return path 44 and are adapted to receive data via the data path 42 and to transmit the data to the data return path 44 in a manner explained in more detail in the following. The data generated by the safety related participants 22 and transmitted via the data return path 44 preferably comprises diagnostic information and/or status information generated by the respective safety related participant 22. This information can, in particular reproduce the safety-relevant switching state of the respective protective device 24 which is also crucial for the interruption of the test signal path, this means the state "secure" or "non-secure" taken on by the protective device 24. The safety control 10 is thereby in a position to determine which safety related participant 22 caused the cutoff, in the case that a safety related cutoff was triggered. Furthermore, the data transmitted to the safety control 10 can comprise additional information generated by the protective device, such as e.g. a piece of information which indicates a degree of contamination of a front disc of a laser configured as a protective device 24 which piece of information is derived from a generated "weak" signal. The data sent by the safety control 10 and received by the safety related participants 22 can e.g. be a demand generated by the safety control 10 to carry out a function of the protective device 24, such as e.g. an actuation of a locking function when the protective device 24 is configured as a door lock for a safety door.

The interconnection modules 26 respectively have an input/output interface 68, in particular a binary input/output interface 68 which is respectively connected to the logic unit 50 via a signal path 54 which interface is connected to an input/output interface 68 of the protective device, in particular a binary and/or non-secure input/output interface 68 of the protective device 24, via at least one signal conductor 70 provided in the interconnection line 30 in order to transmit data received via the data return path 44 to the protective device 24 and/or in order to transmit output data generated by the protective device 24 to the safety control 10 via the data return path 44.

Figure 2:
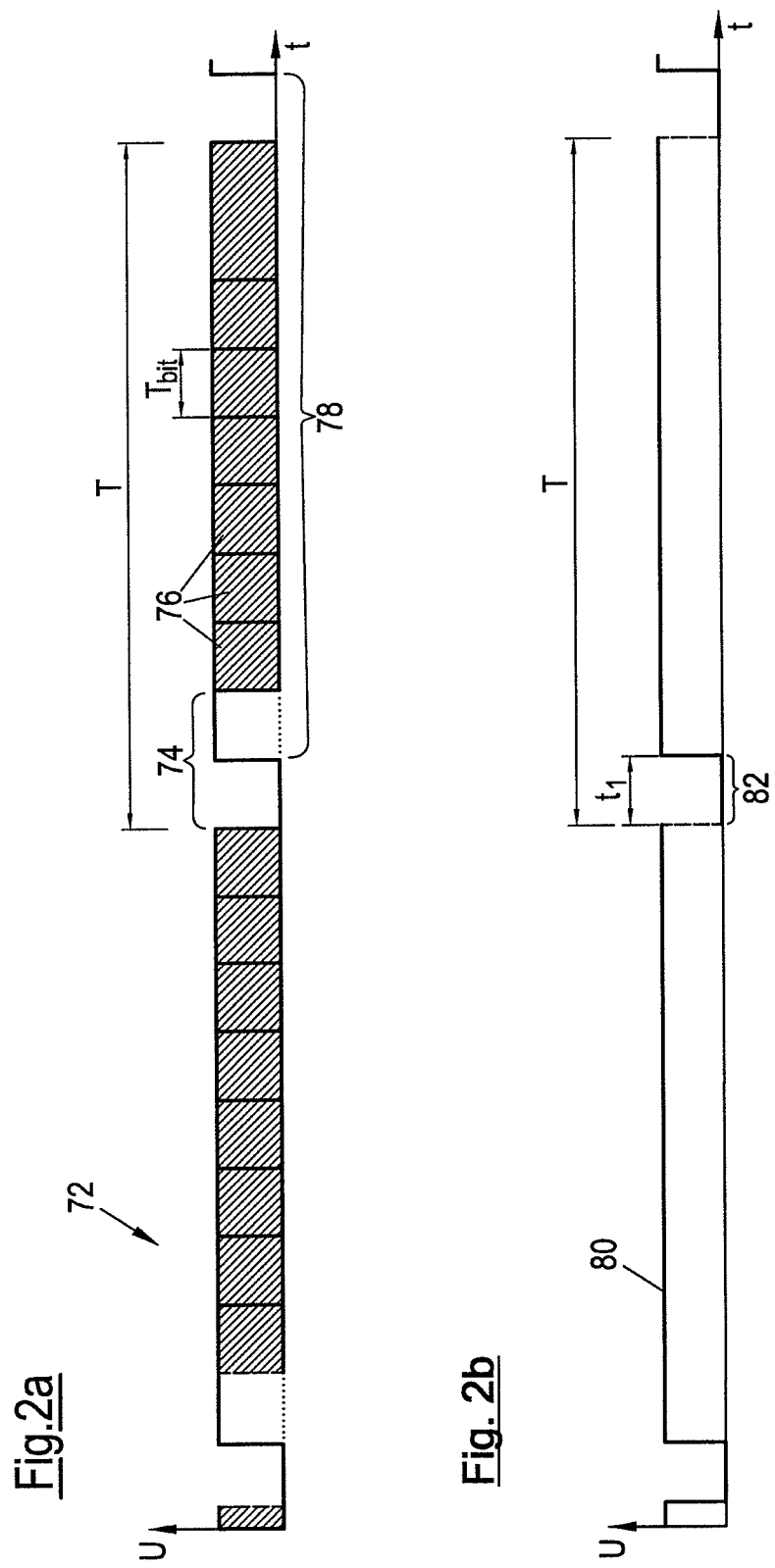

The principle of function of the previously described embodiment of the safety system in accordance with the invention is explained in the following with reference to FIG. 1 and FIG. 2, wherein FIG. 2 shows exemplary sequences of the signals transmitted via the bus line 18 of the safety system.

FIG. 2a shows an exemplary output signal 72 generated by the safety control 10 and transmitted via the output X1. The output signal 72 is based on the electric voltage U and has periodically arising synchronization features 74 arising at a cycling time T and has data features 76 arranged between the synchronization features 74, said data features respectively representing a data bit of the output data sent by the safety control 10. The signal section between the increasing flank of a synchronization feature 74 and the data features 76 subsequent thereto up to the increasing flank of the next synchronization feature 74 respectively form one of a plurality of consecutively following data frames 78. A synchronization feature 74 is respectively composed of a low voltage level (e.g. ground potential and/or 0 Volt) continuously present for a bit duration $T_{bit}$ and a high voltage level (e.g. 24 Volts) following thereupon and continuously applied for a bit duration $T_{bit}$.

As described in the foregoing, the output signal 72 is transmitted to the termination element 32 via the forward path 38 substantially unchanged which termination element 32 receives the output signal 72 and therefrom generates a test signal 80, exemplary illustrated in FIG. 2, said test signal being changed with respect to the output signal 72 and being transmitted to the return path 40 of the test signal path 36 in a signal driving manner by the termination element on use of the logic unit 56 and the test signal generator 60. The test signal 80 has test gaps 82 arising periodically with the cycling time T each having a duration time $t_1$, wherein the signal respectively continuously has the low signal level during the duration $t_1$ of the test gaps 82 and has a continuously present high signal level between two subsequently following test gaps 82. The logic unit 56 synchronizes the test signal 80 with the received output signal 72 in such a way that the start of the test gaps 82 respectively coincides with the start of the synchronization features 74 in time at least with respect to a small tolerance. For this purpose the termination element 32 uses an own time base, such as e.g. a clock generator of the microprocessor 58 and monitors the presence of the synchronization features 74 in the received output signal 72 in order to match this own time base to the presence of the synchronization features 74.

The safety related participants 22 are configured to let through and/or to forward the test signal 80 transmitted via the return path 40 to the respective next safety related participant 22 in the line and/or finally the safety control 10 on the presence of an error-free state of the safety related participant 22 and in the secure state of the respective protective device in such a way that the test signal 80 arrives at the safety input I1 of the safety control 10 substantially unchanged in the secure state of all of the safety related participants 22. The safety control 10 is adapted to receive the signal transmitted via the return path 40 of the test signal path 36 at the safety input I1 and to compare this to an expectation configured in the safety control 10. In this connection the safety control 10 checks whether a respective test gap 82 having the expected duration $t_1$ is received at the expected spacings and at the expected points in time, this means in synchronization with the transmitted synchronization features 74. If the received signal does not correspond to this expectation this allows a conclusion to be drawn on a non-secure state of at least one protective device 24 or on an error function of the safety system and the safety control 10 initiates a suitable safety measure e.g. a safety related cutoff of a monitored plant by interruption of the current supply to this plant.

Since the test signal 80 transmitted via the return path 40 during the operation of the safety system is different from the output signal 72 transmitted via the forward path 38 and only the test signal 80 corresponds to the expectation of the safety control 10 e.g. a cross-circuit between the forward path 38 and the return path 40 of the test signal path 36 leads to an absence of the expected signal at the safety input I1. Such an error function, which can, for example, arise due to a squashing of a bus cable 20, thus reliably leads to a violation of the expectation of the safety control and to a safety related cutoff in such a way that a tolerance of such an error state is excluded by the safety control 10.

The forward path 38 of the test signal path 36 connected to the output X1 forms a ring-shaped data path 42 configured as a ring bus with the data return path 44 connected to the input I2 via which data path the safety control 10, the termination element 32 and the safety related participants 22 communicate with one another and indeed in accordance with a kind of daisy-chain bus communication described in the following. The safety control 10, the termination element 32 and the safety related participants 22 in this connection form the participants of the bus communication, with the safety control 10 simultaneously representing the bus master.

In order to receive data from the data path 42 and to transmit data via the data path 42 each participant 22, 32 is configured to receive an incoming data signal transmitted via the data path 42 at an input, to process the received data and to preferably simultaneously transmit an output data signal to the data path 42 at an output different from the input in such a way that the participants 22, 32 form a message chain along which the data can be transmitted from one participant 22, 32 to the next in a predefined data flow direction. The logic units 50, 56 of the safety related participants 22 and the termination element 32 in this connection serve as a transmission and reception circuit via which the respective participants 22, 32 receive and send data. Each participant 22, 32 is associated with an unambiguous address which corresponds to its position in the message chain with respect to the data flow direction. Since the output signal 72 including the output data of the safety control 10 is initially looped through the safety related participants 22 without interruption up to the termination element 32, the termination element 32 is the first element in the message chain and has the address 1. The safety related participants 22 are incrementally addressed starting from the address 1 in accordance with their sequential arrangement in which they follow one another in the data return path 44 starting from the termination element 32 and are connected to the data return path 44 for data communication.

FIG. 3 exemplifies the data communication and shows exemplary signals which are transmitted via the data path 42.

At the top of FIG. 3 the output signal 72 of the safety control 10 is shown which, as is described above with reference to FIG. 2, has cyclic synchronization features 74 and data features 76 and/or bits lying there between, which form data frames 78 following one another. The remaining data signals 86_x with x=1, 2, 3, 8, 16, 32 shown in FIG. 3 respectively represent the data signals which the participants 22, 32 having the address x=1, 2, 3, 8, 16, 32 respectively send to the next participant 22, 32 having the next highest address and are received by this. In FIG. 3 a system having 32 communication participants 22, 32 is assumed, with only the data signals 86_1, 82_2, 86_3, 86_8, 86_16 and 86_32 of the participants 22, 32 having the addresses 1, 2, 3, 8, 16 and 32 being shown in FIG. 3.

The synchronization features 74 included in the output signal 72 are used as frame signals for the bus communication whose increasing signal flank respectively marks the start and the end of a frame. The participants 22, 32 synchronize their communication on the bus on use of the synchronization features 74. For this purpose, the participants can monitor the presence of the synchronization features 74 either on the forward path 38 or on the data return path 44 and synchronize the readout and transmission of the data with these. As shown in FIG. 3, the data signals 86_1 to 86_32 sent by the participants 22, 32 also include the synchronization features 74 at the same point in time like the output signal 72.

Each participant 22, 32 identifies the time windows with reference to addresses known to him and the frame signals at which time windows the data features 76 provided for him are included in his incoming data signal and at which he may transmit output data features 76 in his output data signal.

Each participant 22, 32 reads the data determined for him from the incoming data signal and transmits an output data signal which includes the data addressed to the remaining participants 22, 32 included in his incoming data signal and additionally includes the output data generated by the respective participant 22, 32. The data transmitted by one of the participants 22, 32 thus correspond partly to the data received by the participant 22, 32 in such a way that this data is forwarded unchanged and moreover includes additional data generated by the respective participant 22, 32. The data addressed to a participant 22, 32 and readout by this is preferably not forwarded to the subsequent participants 22, 32. Rather more, the time windows and/or bits becoming free can be used for the transmission of the output data generated by the same participant 22, 32 in such a way that the data capacity is ideally used at the data path 42.

The data forwarded unchanged by one of the participants 22, 32, as illustrated by the arrows 87 in FIG. 3, is transmitted delayed with respect to the incoming data by a duration $T_{bit}$, corresponding to a bit, in such a way that a requirement in time of a participant 22, 32 for the processes in connection with the data communication can be compensated. The delay of the data thereby brought about in the ring bus is considered by the participants 22, 32 in the time windows provided for the respective participants 22, 32 on the identification and on the readout and transmission of data in these time windows.

The communication at the ring bus follows a fixed protocol which e.g. allows for the transmission of predefined data of the termination element 32 and/or of the safety related participants 22 to the safety control 10. The protocol is selected in such a way that a data signal 86_32 corresponding to the protocol arrives at the safety control only for an intact data path 42, this means on the non-presence of line errors, such as cross-circuits, short-circuits or interruptions of the data path 42. The safety control verifies the received data signal 86_32, this means it checks e.g. the integrity of the received data frame 78 for transmission errors and plausibility errors. A safety related cutoff can be carried out when the received signal does not correspond to the protocol and/or a continuously invalid communication is determined.

FIG. 4 shows a safety system in accordance with the invention substantially corresponding to the safety system shown in FIG. 1, wherein additional details of three different types of safety related participants 22 are illustrated. The safety related participant 22 illustrated on the right hand side in FIG. 4 comprises a protective device 24 which can be configured as a laser scanner 88, a light grid 90 or as a transponder switch and which has two switching signal outputs configured as OSSD (output signal switching device) outputs which are respectively connected to the test circuit 62 of the interconnection module 26 via a connection 64 formed by an individual signal switching signal line 94 of the interconnection cable 28. An interruptible signal transmission path respectively arranged in the test circuit 62 of the safety related participant is controlled through a switching signal output, the signal transmission path being arranged in the return path 40 of the test signal path 36 in order to interrupt the test signal path 36 on the occurrence of the non-secure state of the protective device. Moreover, the protective device 24 is connected to the current supply of the safety system via the current supply conductors 46', 48' of the interconnection cable 28. The protective device 24 is further connected to the logic unit 50 of the safety related participant 22 via two signal conductors 70 of the interconnection cable 28 and via signal paths 54 arranged in the interconnection module 26, wherein the two signal conductors 70 are connected to an input/output interface of the protective device 24.

The middle safety related participant 22 in FIG. 4 comprises a protective device 24 which is configured as a two-channeled emergency cutoff switch 91 or as a two-channeled door lock 92 for a safety door. The protective device 24 comprises two switches 96*a*, 96*b* which each have a mechanical electrical switching contact and which are respectively connected to the test circuit 62 via a connection 64 of the interconnection line 30, wherein a connection 64 respectively comprises a forward line 98*a*, 98*b* and *a* return line 100*a*, 100*b* which together with the switch 96*a*, 96*b* form a first and a second electrical switching path. When the middle protective device 24 is configured as a door lock 92, then the associated interconnection line 30 can comprise a signal conductor 70 of the interconnection line 30, as is shown in FIG. 4 which, on the one hand, is connected to the logic unit 50 of the interconnection module 26 via a signal path 54 and, on the other hand, to a signal input of the protective device 24 in such a way that a locking function of the door lock 92 can be activated by a transmission of a corresponding control signal via the signal conductor 70. Furthermore, a first current supply conductor 46' of the interconnection line 30 is shown.

The safety related participant 22 shown on the left hand side in FIG. 4 comprises two light barriers 102 each having two parallel optical signal paths 104 which are interruptible on the presence of an object as a protective device 24. The light barriers 102 are connected to the interconnection module 26 via a connection 64 of the interconnection cable 30 formed by a forward line 98 and a return line 100 and are directly included in the test signal path 36 via the interconnection module 26, this means without an intermediate switching of a test circuit of the interconnection module 26 in such a way that the test signal uses the optical signal paths 104 as a direct transmission path and the test signal path 36 is interruptible by interruption of the light barriers.

The logic units 50 of the interconnection modules 26, as is e.g. shown in FIG. 4, are connected to the return path 40 of the test signal path 36 and/or to the test circuit 62 arranged in the return path 40 via a plurality of signal paths 64. The logic unit 50 and its microprocessor 52 in this connection represent an evaluation unit which can monitor signals transmitted via the return path and the switching state of the protective device 24 and, in a case of error, can control an interruption switch 66 (see FIG. 1) arranged in the return path 40 in order to open this and thereby to interrupt the return path 40 and to cause a safety related cutoff.

By way of example, the logic unit 50 can check whether the protective channels of the protective device 24 are switched together in accordance with their function or whether a discrepancy between the two protective channels is present on use of a multi-channeled protective device 24 and can open the interruption switch 66 in the case of a discrepancy. Even if the test signal path 36 can in any way already be interrupted on an opening of at least one of the protective channels of the protective device 24 in accordance with the safety function of the safety system, the safety of the overall system is increased thereby. For example, the logic unit 50 can permanently open the bridging switch 66 in the previously described case of error also then when the safety device 24 is brought back into the secure state having closed protective channels up until the functional capability of the safety related participants 22 is reproduced again. Up until then, a reactivation of the safety system is prevented such that a tolerance of the present error is excluded.

An exemplary functional principle of the logic unit 50 as an evaluation unit which recognizes a discrepancy between the protective channels will be described in more detail in the following with reference to FIG. 5.

FIG. 5 shows a safety related participant 22 having a two-channeled protective device 24, this means a protective device 24 having two protective channels. Each protective channel of the protective device 24 is associated with one of two interruptible signal transmission paths of the safety related participant 22 and/or of the protective device 24 arranged in the return path 40 which channels are not individually illustrated in FIG. 5 and which can be interrupted together on the occurrence of a non-secure state of the protective device 24. The interruptible signal transmission paths are preferably electrically connected in a row between a test signal input 106 and a test signal output 108 of the safety related participants 22, this means they are switched in series.

Each protective channel of the protective device 24 is connected to the interconnection module 26 and/or a test circuit 62 of the interconnection module 26 via a connection 64 of the interconnection line 30. As was previously described with reference to FIG. 4 and the safety related participant 22 shown there in the middle, such a connection 64 can, for example, be formed by a forward line and a return line between which an interruptible electronic switch or an optical signal transmission path arranged in the protective device 24 is arranged. Likewise, the connection 64 can preferably comprise a single switching signal line, preferably a single conductor switching signal line, connected to an e.g. digital switching signal output, for example, an OSSD output of the protective device 24, wherein an interruptible signal transmission path arranged in the safety related participant 22 and/or in the test circuit 62 is controlled through the switching signal output in order to open and to close this in dependence on the secure or non-secure state of the protective device.

The logic and/or evaluation unit 50 is connected to the interruptible signal transmission paths and/or the connections 64 via a plurality of signal paths 54 in order to determine whether the first and the second interruptible signal transmission path were interrupted together or were controlled together for interruption when a non-secure state of the protective device 24 arises. For this purpose the logic unit 50 can check whether the two interruptible signal transmission paths were simultaneously interrupted, possibly apart from a certain predefined tolerance in time, for which purpose the logic unit 50 can use a microprocessor 52 (FIG. 1) as well as an own time base of the logic unit 50, such as, in particular a clock generator of the microprocessor. If a protective channel of the protective device 24 comprises a switching signal output, as previously described, by means of which an interruptible signal transmission path is controlled, then the logic unit 50 can be connected to the corresponding switching signal output via the connection 64. Rather than checking whether the respective interruptible signal transmission path is actually interrupted, the logic unit 50 can then check whether the interruptible signal transmission path is controlled for interruption. The logic unit 50 controls the interruption switch 66 via a signal path 54 arranged between the evaluation unit 50 and the interruption switch 66 in order to open this when the two interruptible signal transmission paths are together not interrupted or have been together controlled for interruption.

The evaluation unit 50 can also be adapted to recognize a line error of one or more connection lines 64, such as, for example, a cross-circuit between different connection lines 64 and/or a short circuit between a forward line and a return line of the same connection line 64.

As is likewise shown in FIG. 5 the evaluation unit 50 is also connected to the test signal output 108 via a further signal path 54 in such a way that the evaluation unit 50 can also monitor the test signal output via the test signal output 108. The evaluation unit 50 can thus also monitor the outgoing test signal of the safety related participant 22 in addition to or in the framework of the previously described discrepancy monitoring and can possibly bring about an interruption of the interruption switch 66 in dependence on this monitoring.

FIG. 6 shows a further embodiment of a safety related participant 22 for use in a safety system as is shown in FIG. 1 having an evaluation unit 50 which checks the protective channels of the protective device 24 with regard to a discrepancy. FIG. 6 additionally shows the components of a test circuit 62 of the safety related participant 22 described in the following with reference to FIG. 8 and FIG. 9.

The interruptible signal transmission paths of the safety related participant 22 shown in FIG. 6 are formed by switches 96*a*, 96*b* of the protective device 24. The switches 96*a*, 96*b* are respectively connected to the interconnection module 26 via a forward line 98*a*, 98*b* and a return line 100*a*, 100*b* of the interconnection line 30 and are electrically connected to one another in series via a test circuit 62, as is described in the following in connection with the FIG. 8 in detail. The logic unit 50 is connected to the two forward lines 98*a*, 98*b* and return lines 100*a*, 100*b* via corresponding signal paths 64. The logic unit 50 is configured to detect the switching state of the two switches 96*a*, 96*b* via the signal paths 54*a* and to check whether the two switches 96*a*, 96*b* are interrupted together in the case of an occurrence of a non-secure state of the protective device 24 and in order to control and to interrupt the interruption switch 66 via a further signal path 54 when a discrepancy of the two switches 96*a*, 96*b* is recognized, this means when the two switches 96*a*, 96*b* are not interrupted together.

The interconnection module 26 in FIG. 6 can be used both with a protective device 24 having electrical switches 96*a*, 96*b* as shown in FIG. 4 and also with a protective device 24 having digital switching signal outputs or with a protective device 24 having a combination of the two.

The interconnection module 62 shown in FIG. 6 respectively its test circuit 62 for this purpose has two further electrical or electronically controllable switches 105*a*, 105*b* arranged in the test signal path 36 besides the connections provided for the connections 64 to the switches 96*a*, 96*b* via the interconnection line 30 which controllable switches can, for example, comprise field effect transistors or bipolar transistors and which can be controlled in dependence on a switching signal of a corresponding switching signal output of a protective device 24 and can, in particular on the occurrence of a non-secure state of the protective device 24, be opened to to interrupt the test signal path 36. The switches 105*a*, 105*b* thus represent signal transmission paths which are normally closed on the connection of corresponding switching signal outputs of the protective device 24 and/or which are maintained in the closed state by the constantly transmitted switching signals of the protective device 24 and which are interrupted together on the occurrence of a non-secure state of the protective device 24. For this purpose the interconnection module 26 has connections via which the control inputs of the electrical or electronically controllable switches 105*a*, 105*b* can be respectively connected to a corresponding switching signal output of the protective device 24 and/or a switching signal line of the interconnection line 30, preferably a single conductor switching signal line of the interconnection line 30. If a protective device 24 is connected to the interconnection module 26 without corresponding switching signal outputs, as is shown in FIG. 6, this means that if the switching signal is not applied at the control inputs of the switches 105*a*, 105*b*, then the switches 105*a*, 105*b* are continuously opened.

A safety related participant 22 having an interconnection module 26 which is only configured for the use with a protective device 24 having switches 96*a*, 96*b* corresponding to the safety related participant of FIG. 6 is shown in FIG. 7. Likewise an interconnection module 26 can principally only be configured for the use with a protective device 24 having switching signal outputs which control switches 105*a*, 105*b* of the interconnection module 26 as is shown in FIG. 6. The design of the test circuit 62 can principally be matched to the type of the protective device 24 for whose use the respective interconnection module 26 is adapted.

FIGS. 6 and 7 moreover show the individual components of the test circuit 62 which will be described in the following in more detail with reference to FIG. 8 and which comprises a first inverter 110, a controlled current source 112, a second inverter 116, a controlled current sink 118, a current directing element 120 having a Zener diode 121, a dynamic unit 122 (FIG. 7) and two diodes 124. Moreover, a signal amplifier or a signal driver 125 is shown which is arranged between the interruption switch 66 and the test signal output 108 and which outputs the test signal in a signal driving manner to the subsequent sections of the return path 40.

FIG. 8 shows a safety related participant 22 having a test circuit 62 as is shown in FIG. 6 and FIG. 7 which serves for the recognition of a cross-circuit or a different error in the interconnection line 30.

The dynamic signal 80 (FIG. 9) transmitted via the return path 40 of the test signal path 36 is received at the test signal input 106 of the interconnection module 26. As was described in the foregoing it is preferably a voltage-based signal, in particular a binary direct voltage signal having test gaps 82 of a predefined constant duration at periodic intervals, during which the test signal constantly has a low voltage level and between which the test signal continuously has a high voltage level.

The test signal input 106 is connected to the input of the inverter 110 which receives and inverts the incoming test signal and outputs an inverted test signal, preferably a likewise voltage-based test signal, at its output. On the inversion a high signal level and/or voltage level of the incoming signal is converted into a low signal level and/or voltage level of the outgoing signal and a low signal level and/or voltage level of the incoming signal is converted into a high signal level and/or voltage level of the outgoing signal. A diode 124 can likewise be arranged between the test signal input 106 and the input of the inverter 110, as shown in FIGS. 6 and 7, the diode 124 being polarized in the positive signal flow direction of the test signal and preventing a positive current flow from the safety related participant 22 to the upstream section of the return path 40 of the test signal path 36. This diode 124 is, however, not necessarily required.

The output of the inverter 110 is connected to the control input of the controlled current source 112 which is configured to convert the direct voltage signal provided by the inverter 110 into a direct current signal in such a manner that a high level of the direct voltage signal provided by the inverter 110 corresponds to a high level of the direct current signal and a low level of the direct voltage signal provided by the inverter 110 corresponds to a low level of the direct current signal. The controlled current source 112 is configured as an active current source and is adapted to actively generate a positive outgoing electric current flow with respect to the technical current flow direction which, as previously described, depends on the applied control signal. As is shown in FIG. 6 and FIG. 7 a diode 124 can be arranged between the output of the controlled current source 112 and the forward line 98a which is polarized in the direction of the outgoing current of the current source 112 which prevents a current flow from entering into the current source 112. An incoming current flow into the current source 112 can in principle be prevented in an arbitrary manner, for example, in that the current source 112 is itself configured in such a way that such a current is avoided. Likewise a similar blocking element can be provided instead of the diode 124 which prevents a current from entering into the current source 112.

The current signal generated by the controlled current source 112 is transmitted to a current flow element 114 of the test circuit 62 via the first electrical switching path, this means via the forward line 98a, the switch 96a, which is closed in the secure state of the protective device 24 and via the return line 100a. The current flow element 114 is an electrical load and/or a passive electrical element or component and is configured to receive a current signal transmitted via the return line 100a at its input and to output a direct voltage signal at its output which depends on the received current signal and indeed in the present embodiment in such a way that a high current level of the incoming current signal corresponds to a high voltage level of the outgoing voltage signal and a low current level of the incoming current signal corresponds to a low voltage level of the outgoing voltage signal.

The voltage signal generated by the current flow element 114 is transmitted to the second inverter 116 which receives and inverts the signal and outputs an inverted signal at its output, wherein, during the inversion, a high signal level and/or voltage level of the incoming signal is converted into a low signal level and/or voltage level of the outgoing signal and a low signal level and/or voltage level of the incoming signal is converted into a high signal level and/or voltage level of the outgoing signal.

The output of the inverter 116 is connected to a control input of the controlled current sink 118 which is configured to convert the direct voltage signal provided by the inverter 116 into a direct current signal in such a way that a high level of the direct voltage signal provided by the inverter 116 corresponds to a high level of the direct current signal and that a low level of the direct voltage signal provided by the inverter 116 corresponds to a low level of the direct voltage signal. The controlled current sink 118 is configured as an active current sink and is adapted to generate an electric current flow at its output which is a positive incoming electric current flow, this means a negative outgoing current flow with respect to the technical flow direction which depends on the applied control signal in the previously described manner.

The direct current signal generated by the controlled current sink 118 is transmitted to the current directing element 120 via the second electrical switching path, this means via the forward line 98b, the switch 96b, which is closed in the secure state of the protective device 24 and via the return line 100b. As becomes obvious at this point, the description of the lines 98b, 100b as "forward" line and/or "return" line is not related to the technical current flow direction, but rather to the signal flow direction which in the case of the switch 96b is opposite to the technical current flow direction, since the current sink 118 generates and transmits a current signal defined by an incoming current.

The current directing element 120 is configured to output a direct voltage signal at its output which is dependent on the received direct current signal. The current directing element 128 generates a voltage signal corresponding to the received current signal, as long as the value of the current signal transmitted via the second switching path received by the current directing element 120 and defined by an outgoing current of the current directing element 120 changes between an expected low level of, e.g. 0 mA, and an expected high level of, e.g. 10 mA. In this case the current directing element 120 preferably generates a direct voltage signal at its output which corresponds to the current signal received at its input, this means that a high outgoing current level of the current signal corresponds to a high voltage level of the voltage signal and a low outgoing current level of the current signal corresponds to a low level of the voltage signal.

The current directing element 120 is further adapted to recognize when—in contrast to the expectation for an error-free operation—an incoming current flow is present at the current directing element 120 and/or to recognize when an outgoing current flow is indeed present at the current directing element 120 whose level, however, does not correspond to an expected level during an error-free operation of the safety related participant 22 at least for a certain period of time, this means that in the present case neither the high level expected for an error-free operation nor the low level expected for an error-free operation of the current signal transmitted via the second electrical switching path. For example, an error can be assumed when the value of the outgoing current at the current directing element 120 lies beneath the expected high level of the current signal of the current sink 118 and above the expected low level of the current signal from the current sink 118. In the aforementioned cases the current directing element 120 preferably generates a voltage signal at its output which leads to a violation of the expectation of the safety control, possibly in cooperation with the dynamic unit 122 explained in the following. The current directing element 120, for example, generates a voltage signal having a level which continuously and/or at least for a complete test cycle duration, this means the duration from the start of a test gap up to the expected beginning of the next test gap of the test signal expected by the safety control, takes on a substantially constant value.

The current directing element 120 can be configured as an electrical load and/or as a passive electrical element and/or component. The current directing element 120 can comprise a Zener diode 121, as is shown in FIG. 6 and FIG. 7, which is polarized in the direction of the current outflowing from the current directing element 120, with the Zener diode 121, however, not necessarily being required. The Zener diode 121 can be present in its pass band for an expected high level of the current flowing out of the current directing element 120, during which current flow a voltage is applied at the Zener diode 121 which lies in the region of a pass band voltage of the Zener diode 121. The Zener diode can be present in a blocking band region for a current flowing out of the current directing element 120 which is reduced with respect to the expected current and the voltage of this current, which is applied to the Zener diode, is reduced with respect to the pass band voltage of the Zener diode 121.

A dynamic unit 122, as shown in FIG. 8, can be provided in addition to the previous components which receives the voltage signal generated by the current directing element 120 at its input and is adapted to forward the received signal in a substantially unchanged manner when the received signal has the expected dynamic, this means, in particular has regularly arising test gaps. When the received signal does not have the expected dynamic, the dynamic unit outputs a signal having a substantially constant level. In this connection, the dynamic unit images both a constant high level of its input signal and also a constant low level of its input signal with respect to the same high or low level onto its output signal. The unified imaging of both a constant high level and also of a constant low level onto the same level leads to a reduction of state which simplifies the differentiation at the safety control between a case of switch off, this means the presence of a non-secure state of one of the safety related participants from a system error on the basis of an incoming test signal.

In the following the functionality of the test circuit 62 will be explained with reference to the FIG. 8 and FIG. 9, wherein FIG. 9 shows the current and voltage signals which are respectively present between the sections of the test signal path 36 arranged between the components of the test circuit 62 for an error-free function of the safety related participants 22 and in the secure state of the protective device 24 in which the two switches 96a, 96b are closed. The test signal 80 is shown at the top of FIG. 9 which is based on the electric voltage U input at the test signal input 106 as it is output by the termination element 32. The inverter 110 generates a voltage signal $U_{110}$ inverted with respect to the received test signal 80, this means a voltage signal $U_{110}$ having a low voltage level during the high signal level of the incoming test signal 80 and a high voltage level in the shape of a test pulse during the test gap 82 of the received test signal 80 as is shown in FIG. 9. The controlled current source 112 generates a current signal $I_{112}$ formed by a current $i_{out}$ outgoing from the current source 112 therefrom having a substantially identical shape with respect to the voltage signal $U_{110}$, this means a current pulse having a high outgoing current level during the test gap 82 of the received test signal 80 and a low current level between two current pulses.

This current signal $I_{112}$ is transmitted to the current flow element 114 which generates a voltage signal $U_{114}$ from the transmitted current signal $I_{112}$ which is identical in its shape with respect to the voltage signal $U_{110}$ generated by the inverter 110. The voltage signal $U_{114}$ generated by the current flow element 114 is inverted by the inverter 116 in such a way that this makes available a voltage signal $U_{116}$ at its output and transmits this to the controlled current sink 118 which signal is identical in its shape with respect to the test signal 80 received at the test signal input 106. From this the current sink 118 generates a current signal $I_{118}$ formed by an incoming electric current $i_{in}$ of the current sink 118 which is identical in its shape with respect to the voltage signal $U_{116}$ provided by the inverter 116 and which is transmitted to the current directing element 120 via the switch 96b which current directing element generates a voltage signal $U_{120}$ therefrom which is identical in its shape with respect to the current signal $I_{118}$ provided by the current sink 118 and consequently is identical with respect to the test signal 80 incoming at the test signal input 106. The dynamic unit 122 forwards the signal $U_{120}$ substantially unchanged when the signal $U_{120}$ has the expected dynamic. Otherwise the dynamic unit 122 outputs a signal having a substantially constant level. The output signal of the dynamic unit 122 is made available at the test signal output 108 of the safety related participant 22.

Thus, a test signal is made available at the test signal output 108 for an intact safety related element 22 and in the secure state of the protective device 24 which test signal is identical with respect to the test signal received at the test signal input 106 with respect to the properties to be checked by the safety control 10, in particular the signal shape and the signal synchronization in such a way that the expectation of the safety control is satisfied.

If at least one of the switches 96a, 96b of the protective device 24 is opened on the occurrence of a non-secure state of the protective device 24, then the current flow element 114 and/or the current directing element 116 is/are no longer excited by the incoming test signal 80 which leads to a loss of the dynamic of the test signal output at the output 108 and thus reliably leads to a safety related cutoff by the safety control. The same effect is brought about by a line interruption of a forward line 98a, 98b or of a return line 100a, 100b in the interconnection line 30 in such a way that also in this case of error a reliable safety related cutoff takes place. In the case of an interruption of the forward line 98a or of the return line 100a a constant high level is present at the output of the inverter 116 such that a permanent control of the current sink 118 takes place and thus a constant incoming current flow is present at the output of the current sink 118 without the expected signal dynamics. In the case of an interruption of the forward line 98b or of the return line 100b no constant output current is generated at the current directing element 120 such that its output signal $U_{120}$ takes on a constant low level without the expected signal dynamics.

Moreover, the test circuit 62 also has the effect that a cross-circuit between the two switching paths is recognized, this means a cross-circuit between the forward line 98a and/or the return line 100a of one electrical circuit path with the forward line 98b and/or the return line 100b of the other electrical circuit path and leads to a safety related cutoff. In the case of such a cross-circuit the second switching path is directly connected to a current source 112, which in the case of a signal having a high level at its control input drives an outgoing current flow. The current source 112 thus counteracts an outgoing current flow at the current directing element 120 in such a way that an incoming current flow is at least partly intermittently set at the current directing element 120 or at least a current flow having a level present at least for a certain period of time which is different from an expected level of the current signal $I_{118}$ expected on an error-free operation and which, for example, lies beneath the expected high level and simultaneously above the expected low level of e.g. 0 mA. The current directing element 120 is configured to recognize such a deviation from the error-free operation on the basis of the current flow through the current directing element 120 and to generate a voltage signal $U_{120}$ at its output in this case, which output signal preferably has a continuously constant voltage level and which leads to a test signal violating the expectation of the safety control 10 at the test signal output 108. Thus, also this case of error can be reliably recognized and can thus not lead to a loss of the safety function, the case of error being due to the parallel guidance of the forward lines 98a, 98b and the return lines 100a, 100b of both electrical switching paths in a common interconnection cable 28.

The test circuit 62 is excited purely by the test signal received at the input 106 and the dynamic of the test signal output at the output 108 is purely generated by the dynamic of this incoming test signal. The test circuit 62 thus completely does without an own time base and, in particular without an own clock generator and the herein described components of the test circuit 62 can all be formed by discrete components, this means that one can do without the use of an integrated circuit, such as, e.g. a microprocessor. The reliability and error safety of the test circuit 62 is considerably increased thereby. Moreover, a delay between the test signal incoming at the test signal input 106 and the test signal outgoing at the test signal output 108 is as far as possible avoided and the reaction time of the safety system is optimized totally.

In the previously described embodiment of a test circuit 62 the inverter 110 and the non-inverting controlled current source 112 together form an inverting controlled current source and the inverter 116 and the non-inverting controlled current sink 118 together form an inverting controlled current sink. Instead of this assembly of the controlled inverting current source and/or current sink from separate components, namely from the inverter 110, 116 and the controlled non-inverting current source 112 and/or current sink 118, also a respective one part controlled inverting current source and/or current sink can be used, this means a controlled current source and/or a current sink which for a high level of the control signal, generate an outgoing and/or an incoming current having a low level and for a low level of the control signal generate an outgoing and/or an incoming current having a high level. Likewise one can in principle do without the current flow element 114 and/or its function which can be integrated into the inverter 116 or into an inverting controlled current sink in that a current controlled inverter and/or a current controlled inverting current sink is used.

The functionality of the previously described test circuit 62 enhancing the safety can also be achieved when the current source 112 and the current sink 118 are exchanged with respect to the described embodiment. An incoming current flow which is generated by a current source 112 is then expected at the current directing element 120 for an error-free operation, in such a way that the current directing element 120 is preferably configured to recognize an error from the fact that—in an unexpected manner—an outgoing current flow is present at the current directing element or an incoming current flow is present which has a level which is not expected for an error-free operation. The current sink 118 is then preferably configured or wired in such a way that an outgoing current flow from the current sink 118 is prevented. For this purpose, for example, a diode, corresponding to the diode 124 connected to the output of the current source 112 as shown in FIG. 9 can be provided at the output of the current sink 118 which has a polarization opposing that with respect to the illustration in FIG. 9.

FIG. 10 shows a further embodiment of a safety system in accordance with the invention which, with the exception of the differences illustrated in the following, corresponds to the safety system shown in FIG. 1. The line-shaped cascade formed by the bus line 18, the safety related participants 22 and the termination element 32 is designed and adapted in the same way as described in the foregoing with reference to the remaining Figures.

In FIG. 10, like in FIGS. 1 and 11 not all individual arrow lines representing the bus signal paths 38, 40, 44 are individually provided with reference numerals for reasons of clarity. However, all arrow lines which at least regionally extend along the same straight line running in parallel to the image horizontal respectively belong to the same one of forward path 38, return path 40 and data return path 44, this means the arrow lines having a section running in parallel to the image horizontal at the height of the output X1 belong to the forward path 38 of the test signal path 36, the arrow lines having a section running in parallel to the image horizontal at the height of the input I2 are associated with the return path 44 of the data path 42 and the arrow line having sections running in parallel to the image horizontal at the height of the safety input I1 are associated with the return path 40 of the test signal path 36.

The safety control 10 comprises a safety module 126 and a connection module 128 which are configured independent from one another and are installed in separate housings. The bus line 18, the safety related participants 22 and the termination element 32 are connected to the safety module 126 via the connection module 128. While the previously described interconnection modules 26 were thus a part of the respective safety related participant 22, the connection module 128 is a part of the safety control 10. The safety module 126 has a standard output X1' and a safety input I1' and is configured to transmit a test signal at its standard output X1' which can, for example, have a high signal level having a plurality of periodically arising test gaps interrupting the high signal level. The safety module 126 preferably receives a recurring test signal at its safety input I1' and compares this to an expectation, wherein the safety module 126 in this embodiment preferably has the expectation in consideration of the type of a known common safety module 126 in that the test signal received at the input I1' is substantially identical to a test signal output at the output X1'.

The connection module 128 receives the test signal output by the safety module 126 and in dependence on this test signal and on use of a logic unit 130 having a microprocessor generates an output signal of the safety control 10 to be output at the output X1 which corresponds to the output signal 72 (FIG. 2a) described in the foregoing with reference to FIGS. 1 to 3. The output signal includes periodically arising synchronization features whose appearance is synchronous with the test gaps in the test signal transmitted by the safety module 126 and which are formed e.g. of a low signal level present for a bit duration followed by a high signal level present for a bit duration. In the present embodiment the output signal additionally includes output data which the connection module 128 receives from a memory programmable control 132 connected thereto and are included in the output signal in the form of data features arranged between the synchronization features.

This output signal runs through the forward path 38 of the line of safety related participants 22 in the manner described in the foregoing with reference to FIGS. 1 to 3 up to the termination element 32. The termination element 32 is adapted to receive the output signal from the forward path 38 and to transmit a test signal to the return path 40 of the test signal path 36, said test signal corresponding to the expectation of the safety module 126. The connection module 128 can be adapted to receive the test signal generated by the safety module prior to the taking into operation of the safety system, in particular during a teaching phase and to configure the termination element 32 on the basis of this received test signal in such a way that this generates and outputs a test signal corresponding to the expectation of the safety module 126 during the orderly operation thereof. For the purpose of this configuration the connection module 128, preferably during the teaching phase, can determine properties of the test signal generated by the safety module 126, for example, the duration between two test gaps or the duration of the test gap and can transmit this information to the termination element 32 which detects the information, preferably stores the information and uses the information for the generation of the test signal. For this purpose the connection module 128 can scan a test signal received from the safety module 126 in order to determine its shape. A configuration of the termination element 32 as previously described prior to the taking into operation of the safety system can also be carried out in a different manner, for example, by means of a configuration computer connected to the safety system during the configuration phase.

The connection module 128 receives the test signal transmitted via the return path 40 at the safety input I1 and receives the data signal transmitted via the data return path 44 at the non-secure standard input I2. The test signal received at the safety input I1 is directly looped through to the safety input I1' of the safety module 126 via a corresponding connection line. The data signal received at the input I2 is evaluated by the logic unit 130 of the connection module 128 and the data contained therein is transmitted to a memory programmable control 132 which processes and evaluates this.

The connection module 128, the safety related participants 22 and the termination element 32 represent consumers of electrical power and, as is shown in FIG. 10, are supplied with electrical power by a common power supply, such as, e.g. a current supply unit 16 formed as a switching power supply. The current supply unit 16 provides a direct voltage potential of e.g. 24 Volt with respect to ground and its first connection 134 and provides a second direct voltage potential, for example a ground potential at its second connection 136. The connection module 128, the safety related participants 22 and the termination element 32 are connected in series one after the other starting from the current supply unit 16 along a current supply line 46 and are conductively connected to the first connection 134 in a galvanic manner for the current supply via the first current supply line 46. Likewise the connection module 128, the safety related participants 22 and the termination element 32 are conductively connected to the second connection 136 in a galvanic manner via a second current supply line 48 for the current supply. As is shown in FIG. 10 the first and the second current supply line 46, 48 respectively run regionally in the bus line 18 and together with the line conductors of the bus line 18 are arranged in common bus cables 20 which form the test signal path 36 and the data path 42.

The connection module 128 having the previously described functional principle enables the coupling of a safety module 126 to the safety system which itself is not adapted to provide the functions realized by the connection module 128 for the connected safety related participants 22 and the termination element 32, but which are rather configured to output a dynamic test signal in a manner known per se for safety modules 126 and to check whether a received test signal corresponds to the output test signal. The demand in effort and cost for the provision of the described safety system is reduced through the usability of such safety modules 126.

FIG. 11 shows a further embodiment of a safety system in accordance with the invention which substantially corresponds to the safety system shown in FIG. 1 and FIG. 10 and which has a current supply improved with respect to that of the system of FIGS. 1 and 10.

The safety system shown in FIG. 11 is divided into two segments A and B with respect to its current supply which sections respectively comprise a plurality of consumers 138a, 138b of electric power which in the present embodiment are formed by the safety related participants 22, the termination element 32 and a feed module 140b to be described in the following. Each segment A, B is respectively associated with one of two separate electrical current supply units 16a, 16b which for the provision of the electrical voltage respectively have a first connection 134a, 134b of a first direct voltage potential of e.g. 24 Volts with respect to ground and have a second connection 136a, 136b of a second direct voltage potential of e.g. 0 Volt with respect to ground respectively a ground potential. In principle, the safety can also comprise more than two segments as previously described which are respectively divided into one or more consumers 138a, 138b.

The two adjacent segments A, B respectively have a first current supply line 46a, 46b and a second current supply line 48a, 48b via which the consumers 138a, 138b of the respective segment A, B are respectively electrically conductively connected to the corresponding first and/or second connection 134a, 134b, 136a, 136b of the associated current supply unit 16a, 16b and between which the electric voltage of the respective current supply unit 16a, 16b is provided. Thereby, the consumers 138a, 138b are supplied with a current in order to provide the herein described functions. The first and the second current supply line 46a, 48a of the one segment A in this connection are separated from the first and the second current supply line 46b, 48b of the second segment B in a galvanic manner.

The safety system shown in FIG. 11 comprises a feed module 140b which is associated with the segment B of the safety system and connects the segment B both via the cable 146b to the associated current supply unit 16b and also via a bus cable 20 to the consumers 138a of the adjacent segment A. The consumers 138b of the segment B are formed by the feed module 140b, the two safety related participants 22 illustrated on the right hand side in FIG. 11 and the termination element 32. The feed module 140b has an own housing which is preferably configured in accordance with the housing protective type IP 20, IP 67 or a different housing protective type protecting from contamination or humidity.

The consumers 138a of the segment A are formed by two safety related participants 22 illustrated on the left hand side in FIG. 11, wherein the left safety related participant 22 directly connected to the safety control 10 of the segment A is connected directly to the current supply unit 16a via the cable 46a without intermediate switching of a feed module 140b.

The feed module 140b is not only connected to the first and the second current supply line 46b, 48b of the segment B but moreover also to the first and the second current supply lines 46a, 48a of the adjacent segment A, wherein the first and the second current supply line 46a, 48a of the segment A and the first and the second supply lines 46b, 48b of the segment B are separated from one another in the feed module 140b in a galvanic manner.

The bus signal path, this means the forward path 38 and the return path 40 of the test signal path 36 and the data return path 44 are respectively divided into two sections, wherein each section is respectively associated with a segment A, B and is electrically conductively connected to consumers 138a, 138b of the respective segment A, B. Likewise, like the current supply lines 46a, 48a, 46b, 48b also those sections of the bus signal path 38, 40, 44 which are associated with different segments A, B are separated from one another in a galvanic manner. At the same time the sections of the bus signal paths 38, 40, 44 separated from one another in a galvanic manner are respectively coupled to one another in a non-galvanic manner by a coupling unit 142 arranged in the feed module 140b, in particular coupled to one another in an optical conductive or capacitive manner, in such a way that, despite the galvanic separation, a continuous signal transmitting connection is present. The coupling units 142 are preferably supplied with a current by at least one of the current supply units 16*a*, 16*b* and for this purpose can preferably be connected to the first and/or the second current supply line 46*a*, 46*b*, 48*a*, 48*b* of the first and/or the second segment A, B via corresponding connections of the feed module 140*b*, wherein the previously described galvanic separation of these current supply lines 46*a*, 46*b*, 48*a*, 48*b* can be maintained. The corresponding connections for the current supply of the coupling units 142 are not illustrated in FIG. 11.

In accordance with an embodiment, the coupling units 142 respectively comprise a transmitter and a receiver for the non-galvanic signal transmission which are respectively associated with a segment A, B are directly electrically conductively connected to a section of a bus signal path 38, 40, 44 respectively associated with the same segment A, B. The transmitters in this connection are respectively configured to transmit a signal received by the respective section of the bus signal path 38, 40, 44 to which they are directly connected to an associated the receiver connected to the other section of the respective bus signal path 38, 40, 44 in a non-galvanic manner. The receivers are correspondingly configured to receive signals from an associated transmitter in a non-galvanic manner and to output these to a section of the respective bus signal path 38, 40, 44 connected to the respective receiver.

Hereby a transmitter and/or a receiver are preferably supplied with a current from the current supply unit 16*a*, 16*b* which is associated to the same segment A, B as the transmitter and/or receiver.

The sections of the first and the second current supply lines 46*a*, 48*a*, 46*b*, 48*b*, as are shown in FIG. 11, are arranged between two consumers 138*a*, 138*b* are respectively arranged together with the corresponding sections of the bus signal path 38, 40, 44 in a common bus cable 20. The feed module 140*b* and the remaining consumers 138*a*, 138*b* in this connection respectively have plug connecting elements, this means a male plug or a female plug via which they can be connected to corresponding plug connection elements of the bus cable 20 for the formation of a plug connection 34, whereby the electrical connection to the line conductors included in the bus cable 20 can be produced. A bus cable 20 is arranged between the safety control 10 and the consumer 138*a* illustrated on the left hand side in FIG. 11 which bus cable comprises a respective line conductor for each of the bus signal paths 38, 40, 44.

Further plug connections 34 serve for the connection of the consumer 138*a* to the current supply unit 16*a* shown on the left hand side in FIG. 11 via the cable 146*a* and for the connection of the feed module 140*b* to the current supply unit 16*b* via a corresponding cable 146*b*.

An electrical fuse 148*a*, 148*b* is respectively arranged in the current supply lines 48*a* and 46*b*, wherein the electrical fuse 148*a* is arranged in the cable 146*a* connected to the current supply unit 16*a* and the electrical fuse 148*b* is arranged in the feed module 140*b*. The fuses 148*a*, 148*b* can be current limiting fuses, such as e.g. safety fuses or different over current protecting fuses.

Through the segmentation of the safety system with respect to the energy supply and through the galvanic separation of the current supply lines 46*a*, 46*b*, 48*a*, 48*b* and the sections of the bus signal paths 38, 40, 44 between the segments A, B, the electromagnetic tolerance (EMT) of the safety system is considerably increased. Moreover, the current loading with regard to which the components of the safety system including the consumers 138*a*, 138*b* have to be designed is reduced in such a way that the safety concept of the safety system is simplified and the complexity of the safety system is reduced. At the same time the segmented safety system can be planned and implemented very simply in that a feed module 140*b*, as described in the foregoing, having a corresponding current supply unit 16*a*, 16*b* is used at suitable positions between two segments separated from one another in a galvanic manner which are to be generated. With respect to the design of the current supply unit 16*a*, 16*b* in this connection only the maximum current consumption of the consumers 138*a*, 138*b* of the respectively associated segment A, B and the line lengths in the same segments A, B have to be considered.

LIST OF REFERENCE NUMERALS

10 safety control
11 switching cabinet
12 main module
14 input/output module
16, 16*a*, 16*b* current supply unit
18 bus line
20 bus cable
22 safety related participant
24 protective device
26 interconnection module
28 interconnection cable
30 interconnection line
32 termination element
34 plug connector
36 test signal path
38 forward path, data forward path
40 return path of the test signal path
42 data path
44 data return path
46, 46*a*, 46*b* first current supply line
46' first current supply conductor
48, 48*a*, 48*b* second current supply line
48' second current supply conductor
50 logic unit, evaluation unit
52 microprocessor
54 signal path
56 logic unit
58 microprocessor
60 test signal generator
62 test circuit
64 connection
66 interruption switch
68 input/output interface
70 signal conductor
72 output signal
74 synchronization feature
76 data feature
78 data frame
80 test signal
82 test gap
86_1 - 86_3, 86_8 data signal
86_16, 86_32 data signal
87 arrow
88 laser scanner
90 light grid
91 emergency cutoff switch
92 door lock
94 switching signal line
96*a*, 96*b* switch 98, 98a, 98b forward line
100, 100a, 100b return line
102 light barrier
104 optical signal path
105a, 105b switch
106 test signal input
108 signal output
110 inverter
112 controlled current source
114 current flow element
116 inverter
118 controlled current sink
120 current directing element
121 Zener diode
122 dynamic unit
124 diode
125 signal amplifier
126 safety module
128 connection module
130 logic unit
132 memory programmable control
134, 134a, 134b first connection
136, 136a, 136b second connection
138a, 138b consumer
140b feed module
142 coupling unit
146a, 146b cable
148a, 148b electrical fuse
A1 direct voltage connection
A2 ground connection
A, B segment
$i_{in}$ incoming electric current
$i_{out}$ outgoing electric current
$I_{112}, I_{118}$ current signal
I1, I1' safety input
I2 input
T cycling time
$T_{bit}$ bit duration
t1 duration of the test gap
U electric voltage
$U_{110}, U_{114}$ voltage signal
$U_{116}, U_{120}$ voltage signal
X1, X1' output

The invention claimed is:

1. A safety system comprising
a safety unit (10) having an output (X1) and a safety input (I1);
a bus line (18) which is connected to the output (X1) and to the safety input (I1) of the safety unit (10);
a plurality of safety related participants (22) connected to the bus line (18) which each comprise a protective device (24);
wherein the bus line (18) and the safety related participants (22) connected to the bus line (18) form a test signal path (36) having a forward path (38) connected to the output (X1) of the safety unit (10) and having a return path (40) connected to the safety input (I1) of the safety unit (10);
wherein a plurality of safety related participants (22) are arranged along the bus line (18) in a line in such a way that both the forward path (38) and the return path (40) of the test signal path (36) run through the same safety related participants (22) and wherein the safety related participants (22) are adapted such that an occurrence of a non-secure state of the associated protective device (24) brings about an interruption of the test signal path (36);
wherein the safety system further comprises:
a termination element (32) connecting the forward path (38) to the return path (40) of the test signal path (36),
wherein the safety unit (10) is configured to transmit an output signal (72) at its output (X1) connected to the forward path (38), wherein the output signal (72) comprises periodically recurring synchronization features (74) and has a time base;
wherein the termination element (32) is configured to receive the output signal (72) from the forward path (38) and to output a test signal (80) to the return path (40) of the test signal path (36), said test signal being changed with respect to the received output signal (72) in dependence on the output signal (72) received from the forward path (38), wherein the test signal (80) generated by the termination element (32) has a high level having a test gap (82), the test gap recurring at periodic spacings;
wherein the safety unit (10) comprises a safety module (126) and a connection module (128) connected to the safety module (126), wherein the bus line (18), the safety related participants (22) and the termination element (32) are connected to the safety module (126) via the connection module (128) and wherein the safety module (126) and the connection module (128) are designed as two devices independent from one another;
wherein the safety module (126) of the safety unit (10) is adapted to make available a test signal at an output (X1') of the safety module (126) and to transmit the test signal to the connection module (128), said test signal corresponding to a test signal expected by the safety module (126), and to check whether the test signal received at a safety input (IF) of the safety module (126) corresponds to the expected test signal, and wherein the connection module (128) is configured to generate and to transmit the output signal (72) of the safety unit (10) in dependence on the test signal transmitted at the output (X1') of the safety module (126);
wherein the connection module (128) is adapted to configure the termination element (32) in such a way that the termination element (32) generates a test signal (80) and outputs the test signal to the return path (40) of the test signal path (36), said test signal corresponding to the test signal expected by the safety module (126); and
wherein the termination element (32) is configured to detect the synchronization features (74), and wherein said test signal (80) transmitted by the termination element (32) is synchronized with respect to the presence of the synchronization features (74) in the output signal (72), and wherein the termination element (32) has its own time base independent from the time base of the received output signal (72) and synchronizes its own time base with the presence of the synchronization features (74) in such a way that the start of the test gaps (82) respectively coincides with the start of the synchronization features (74).

2. The safety system in accordance with claim 1, wherein the safety unit is a safety control.

3. The safety system in accordance with claim 1, wherein the synchronization features (74) comprise an increasing and/or a decreasing flank of the output signal (72).

4. The safety system in accordance with claim 1, wherein the safety unit (10) is adapted to transmit data to the safety related participants (22) and/or to the termination element

(32) and/or wherein the termination element (32) and/or the safety related participants (22) are adapted to transmit data to the safety unit (10).

5. The safety system in accordance with claim 1, further comprising a data path (42) used in common by the safety related participants (22) and the termination element (32), wherein the safety related participants (22) and the termination element (32) are connected in a series one after the other for the reception and/or transmission of data to and from the data path (42).

6. The safety system in accordance with claim 5, wherein the data path (42) is configured as a ring-shaped data path (42) arranged between an output (X1) and an input (12) of the safety unit (10) having a data forward path (32) running between the safety unit (10) and the termination element (32) and having a data return path (44) running from the termination element (32) to the safety unit (10).

7. The safety system in accordance with claim 6, wherein both the data forward path (38) and the data return path (44) run through the safety related participants (22).

8. The safety system in accordance with claim 1, wherein the output signal (72) transmitted by the safety unit (10) comprises synchronization features (74) and data features (76) representing output data, wherein the synchronization features (74) and the data features (76) follow one another in time in the output signal (72).

9. The safety system in accordance with claim 1, wherein at least one of the safety related participants (22) comprises at least one electrical switching path which comprises a switch (96a, 96b) of the protective device (24), wherein the switching path is arranged in the test signal path (36) and can be opened and closed by an opening and a closing of the switch (96a, 96b) of the protective device (24) in order to interrupt and to close the test signal path (36).

10. The safety system in accordance with claim 1, wherein at least one of the safety related participants (22) comprises an interconnection module (26) via which the safety related participant (22) is included in the safety system.

11. The safety system in accordance with claim 1, wherein the safety input (I1) of the safety unit (10) is a secure input.

12. A termination element (32) for use in a safety system, the safety system comprising
a safety unit (10) having an output (X1) and a safety input (I1);
a bus line (18) which is connected to the output (X1) and to the safety input (I1) of the safety unit (10);
a plurality of safety related participants (22) connected to the bus line (18) which each comprise a protective device (24);
wherein the bus line (18) and the safety related participants (22) connected to the bus line (18) form a test signal path (36) having a forward path (38) connected to the output (X1) of the safety unit (10) and having a return path (40) connected to the safety input (I1) of the safety unit (10);
wherein a plurality of safety related participants (22) are arranged along the bus line (18) in a line in such a way that both the forward path (38) and the return path (40) of the test signal path (36) run through the same safety related participants (22) and wherein the safety related participants (22) are adapted such that an occurrence of a non-secure state of the associated protective device (24) brings about an interruption of the test signal path (36);
wherein the safety unit (10) is configured to transmit an output signal (72) at its output (X1) connected to the forward path (38), wherein the output signal (72) comprises periodically recurring synchronization features (74) and has a time base;
wherein the termination element (32) comprises an input for connection to the forward path (38) and an output for connection to the return path (40) and is configured to receive the output signal (72) made available at its input and to output a test signal in dependence on the received output signal (72), said test signal being changed with respect to the received signal (72) and being synchronized with the received output signal (72) to the return path (40) of the test signal path (36), with the termination element (32) having its own time base and being adapted to use this time base for synchronization of the test signal (80) to the received output signal (72), wherein the test signal (80) generated by the termination element (32) has a high level having a test gap (82), the test gap recurring at periodic spacings;
wherein the safety unit (10) comprises a safety module (126) and a connection module (128) connected to the safety module (126), wherein the bus line (18), the safety related participants (22) and the termination element (32) are connected to the safety module (126) via the connection module (128) and wherein the safety module (126) and the connection module (128) are designed as two devices independent from one another;
wherein the safety module (126) of the safety unit (10) is adapted to make available a test signal at an output (X1') of the safety module (126) and to transmit the test signal to the connection module (128), said test signal corresponding to a test signal expected by the safety module (126), and to check whether the test signal received at a safety input (I1') of the safety module (126) corresponds to the expected test signal, and wherein the connection module (128) is configured to generate and to transmit the output signal (72) of the safety unit (10) in dependence on the test signal transmitted at the output (X1') of the safety module (126);
wherein the connection module (128) is adapted to configure the termination element (32) in such a way that the termination element (32) generates a test signal (80) and outputs the test signal to the return path (40) of the test signal path (36), said test signal corresponding to the test signal expected by the safety module (126); and
wherein the termination element (32) is configured to detect the synchronization features (74), and wherein said test signal (80) transmitted by the termination element (32) is synchronized with respect to the presence of the synchronization features (74) in the output signal (72), and wherein the termination element (32) has its own time base independent from the time base of the received output signal (72) and synchronizes its own time base with the presence of the synchronization features (74) in such a way that the start of the test gaps (82) respectively coincides with the start of the synchronization features (74).

* * * * *